(12) United States Patent
Stinson, III et al.

(10) Patent No.: US 8,863,185 B2
(45) Date of Patent: Oct. 14, 2014

(54) SOCIAL TELEVISION

(75) Inventors: Willis David Stinson, III, Sherborn, MA (US); Omar Abdallah Abou-Khamis, Irving, TX (US); Robin Chu-Hsin Chang, Los Altos, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 225 days.

(21) Appl. No.: 12/984,025

(22) Filed: Jan. 4, 2011

(65) Prior Publication Data

US 2012/0174157 A1    Jul. 5, 2012

(51) Int. Cl.
*H04N 7/025*    (2006.01)
*G06F 3/00*    (2006.01)
*H04N 5/445*    (2011.01)
*H04N 21/482*    (2011.01)
*H04N 21/4788*    (2011.01)

(52) U.S. Cl.
CPC ......... *H04N 5/44543* (2013.01); *H04N 21/482* (2013.01); *H04N 2005/44578* (2013.01); *H04N 21/4788* (2013.01)
USPC ............ 725/40; 725/37; 725/38; 725/39; 725/43; 725/44; 725/45; 725/46; 725/47; 725/48; 725/49; 725/50; 725/51; 725/52; 725/53; 725/59; 725/61

(58) Field of Classification Search
CPC .......... H04N 21/42204; H04N 21/431; H04N 21/4788
USPC ................ 725/37, 38–40, 43, 44–53, 59, 61
See application file for complete search history.

(56) References Cited

U.S. PATENT DOCUMENTS

| | | | |
|---|---|---|---|
| 6,407,779 B1 * | 6/2002 | Herz | 348/734 |
| 6,754,904 B1 * | 6/2004 | Cooper et al. | 725/32 |
| 2001/0051989 A1 * | 12/2001 | Moncreiff | 709/206 |
| 2009/0293079 A1 * | 11/2009 | McKee et al. | 725/10 |
| 2010/0083182 A1 * | 4/2010 | Liu et al. | 715/843 |
| 2011/0047487 A1 * | 2/2011 | DeWeese et al. | 715/758 |
| 2011/0078190 A1 * | 3/2011 | Samuel et al. | 707/780 |
| 2011/0119595 A1 * | 5/2011 | Bydeley et al. | 715/738 |
| 2011/0247044 A1 * | 10/2011 | Jacoby | 725/115 |
| 2011/0273625 A1 * | 11/2011 | McMahon et al. | 348/734 |
| 2012/0110621 A1 * | 5/2012 | Gossweiler, III | 725/46 |
| 2012/0167137 A1 * | 6/2012 | Wong et al. | 725/38 |

* cited by examiner

*Primary Examiner* — Nasser Goodarzi
*Assistant Examiner* — Kyu Chae

(57) ABSTRACT

A system may include a media content processing subsystem configured to provide media content to a display device. The system may further include an adjunct computing device in communication with the media content processing subsystem and configured to receive interactive program guide data, receive social information associated with an account on a social network, and display the interactive program guide data augmented with the social information.

23 Claims, 15 Drawing Sheets

SOCIAL TELEVISION

BACKGROUND

The advent of computers, electronic communication, and other advances in the digital realm of consumer electronics has resulted in a great variety of enhanced programming, recording, and viewing options for users who view media content such as television programs. In implementing such enhanced options, media content processing subsystems (MCPSs) such as set top boxes have become important computing devices for accessing media content services and the media content within those services. In addition to supporting traditional analog broadcast video functionality, MCPSs also support an increasing number of digital services such as video-on-demand, internet protocol television ("IPTV"), and personal video recording.

A MCPS is typically connected to a media content provider, and includes hardware and/or software necessary to provide enhanced options for a subscriber television system at a subscriber location. A MCPS is usually configured to provide users with a large number and variety of media content choices. For example, a user may choose to view a variety of broadcast television programs, pay-per-view services, video-on-demand programming, Internet services, and audio programming via a MCPS.

While a MCPS may provide a user with an increasing variety of media content choices, users of such systems still experience media content in substantially the same passive manner as they have done before, with social interaction limited to conversations among those physically present in the same room.

DETAILED DESCRIPTION

Figure 1:
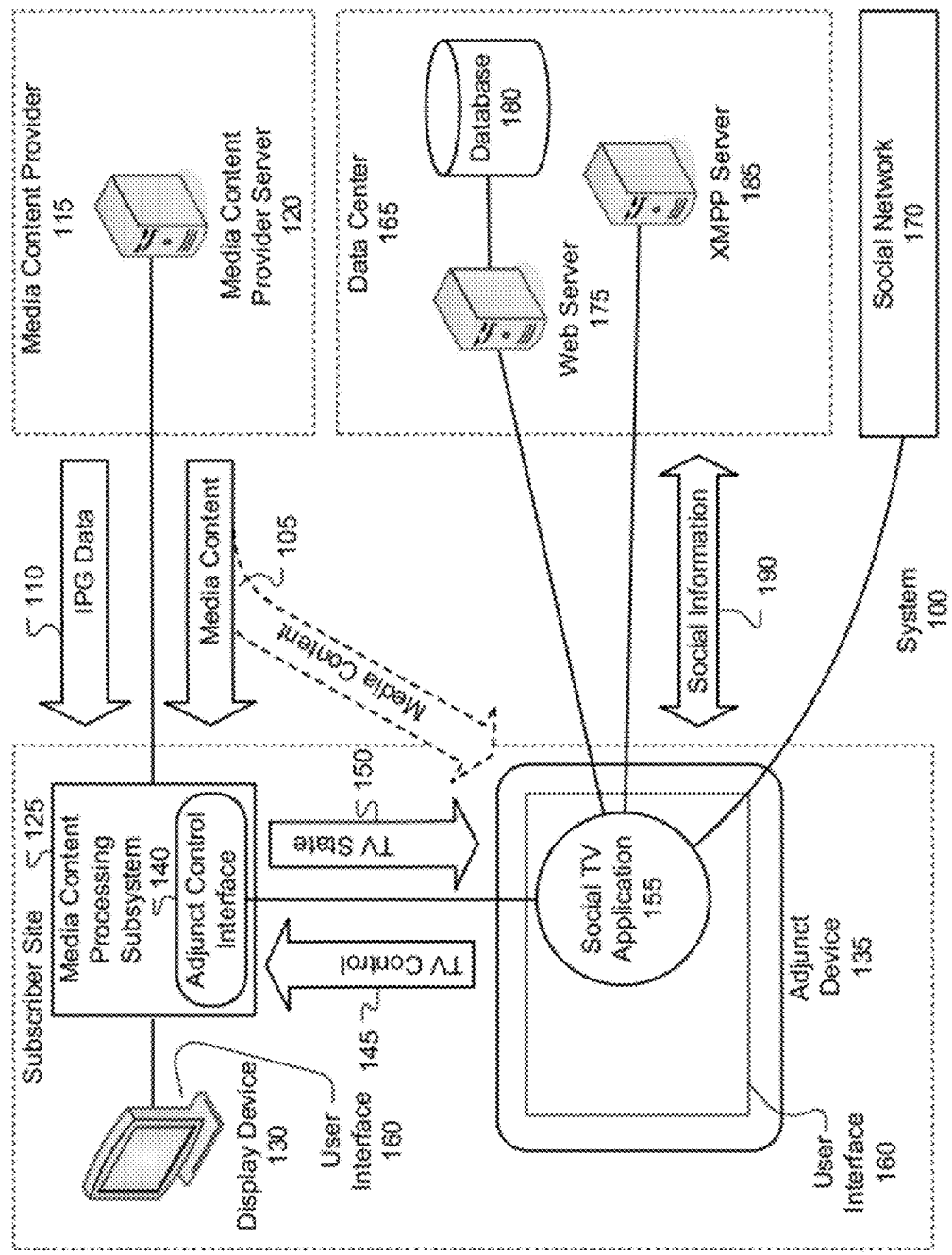
FIG. 1 illustrates an exemplary system for the implementation of social television.

Through social networking, the Internet has become increasingly socially integrated. Facebook allows users to reconnect and keep up with friends and family across the world, in near real-time. Twitter allows users to broadcast messages easily and quickly to an entire world of potential followers. Linked-in allows users to maintain their business contacts and relationships, and recommend people professionally to one another based on their previous work. These and other social networking services allow users to create and maintain a representation of their social relationships online.

A digital representation of the users and their connections to other users may be referred to as a social graph. In a social graph, each person may be represented as a node of the graph, and each connection between people, such as people who are friends, co-workers or family members, may be represented as an edge in the graph. Users may create accounts on a social networking service, and may input their connections to into the service. The social graph may accordingly come to represent and change with the social structure of users who are tied to one another, such as by way of friendship, kinship, common interest, financial exchange, dislike, sexual relationship, beliefs, knowledge and/or prestige.

Once created, social graphs may then be applied to enrich user interaction with content on the Internet. For example, some social networking websites provide functionality that allows users to comment on website content, post those comments to the user's own social networking profile pages, and share those comments with their own friends on one or more social networking sites.

Despite these developments online, viewing of media content via a MCPS continues to be a passive experience. However, through use of a companion device having access to a user's social graph, an enhanced system may transform media content viewing into a new social experience. The enhanced system may associate accounts of subscribers to a media content system with accounts of users on a social network, and may thus use the social graph and other information associated with users of the social network to socially enhance the viewing of media content.

The companion device may augment an interactive program guide to provide features such as an ability to show all friends of the user of the social network who are also watching the same media content, show what media content each of the friends of the user of the social network are experiencing, provide chat functionality to allow the user to communicate with his or her friends from the social network, allow users to invite other social friends to watch a particular instance of media content, allow users to invite other social friends to chat privately, and allow users to provide presence information relating to other social friends who may be logged into the system. Using such a media system augmented with a social graph, the system may accordingly provide real-time interaction which revolves around a shared experience, i.e., watching the same television program at the same time. This form of real-time social television is in contrast to more traditional blogging about TV shows, news, sports, and other media which is not in real-time or in-the-moment. Further details of these and other aspects of the social experience available through use of the companion device are described in greater detail below.

FIG. 1 illustrates an exemplary system 100 for the implementation of social television. The system 100 includes a media content provider 115 having a media content provider server 120 configured to provide media content 105 and interactive program guide (IPG) data 110. The system 100 further includes a MCPS 125 configured to receive IPG data 110 and media content 105 from the media content provider 115 to be displayed on a display device 130. The MCPS 125 includes an adjunct control interface 140 in communication with an adjunct device 135. A social TV application 155 installed on the adjunct device 135 may be configured to send TV control information 145 and receive TV state information 150 through use of the adjunct control interface 140. The adjunct device 135 may further be in communication with a social network 170 and a data center 165 housing a web server 175, a database 180, and an XMPP server 185. The social TV application 155 may thus communicate social information 190 such as messaging, invitations, and user presence information with the social network 170, web server 175, and XMPP server 185. System 100 may take many different forms and include multiple and/or alternate components and facilities. While an exemplary system 100 is shown in FIG. 1, the exemplary components illustrated in Figure are not intended to be limiting. Indeed, additional or alternative components and/or implementations may be used.

The terms media content instance (or instance of media content) may be used to refer generally to any television program, on-demand program, pay-per-view program, broadcast media program, video "on demand" program, commercial, advertisement, video, multimedia, movie, song, photograph, audio programming, network services (e.g., Internet), or any segment, portion, component, or combination of these or other forms of media content that may be presented to and experienced (e.g., viewed or heard) by a user. A media content instance may have one or more components. For example, an exemplary media content instance may include a video component and an audio component. Media content 105 may include one or more media content instances.

IPG data 110 may include information corresponding to instances of media content 105 being broadcast, streamed, or otherwise available for being experienced by users. IPG data 110 may include information on instances of media content 105 such as title, subtitle, program summary, included actors, start and end time for broadcast, and any additional cost that may be incurred to view the media content instance.

The media content provider 115 may be configured to provide various types of media content 105 including, but not limited to, any of the forms of media content 105 described above. The media content provider 115 may further be configured to provide IPG data 110. The media content provider 115 may include a media content provider server 120 configured to communicate with the MCPS 125 via one or more types of networks and communications links. Exemplary networks may include the Internet, an intranet or other private packet-switched network, a cable television network (e.g., a hybrid fiber-coax network), a wireless broadcast network (e.g., a satellite media broadcasting network or terrestrial broadcasting network), a telephone network, a provider-specific network (e.g., a Verizon® FIOS® network), an optical fiber network, or any other suitable network. While FIG. 1 shows a single media content provider server 120, in other embodiments, the media content provider 115 may include multiple media content provider servers 120. In some examples, media content 105 and IPG data 110 may be provided by separate servers 120.

The MCPS 125 may be configured to communicate with and receive IPG data 110 and media content 105 containing one or more media content instances from the media content provider 115. The MCPS 125 and media content provider 115 may communicate using various communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, video codecs including H.323, MPEG3, MPEG4, AVI, WMV, and SWF, and other suitable communications networks and technologies.

The MCPS 125 may be configured to process the media content 105 provided by the media content provider 115 and provide a signal to a display device 130. The MCPS 125 may further be configured to process the IPG data 110 so as to provide an IPG. The display device 130 may be configured to receive the signal and present the IPG and/or media content 105. The display device 130 may include, but is not limited to, a display screen, a television, computer monitor, handheld device, speaker, or any other device configured to present the media content 105. The display device 130 may receive and process output signals from the MCPS 125 such that content of the output signals is received for experiencing by the user. Presentation of an instance of media content 105 may include, but is not limited to, displaying, playing back, or processing the instance of media content 105, or one or more components of the instance of media content 105 such as sound or video.

In some instances the MCPS 125 may be implemented as a standalone set-top box (STB) connected to a display device 130. In other instances, rather than requiring each display device 130 to have its own STB, the MCPS 125 may be implemented as a client-server system in which a home media server gateway MCPS 125 is installed in the home. The home media server gateway MCPS 125 may be in communication with the media content provider 115, and each display device 130 may then use one of several thin client devices to access media content 105 via the home media server gateway MCPS 125. In turn, the home media server gateway MCPS 125 may include one or more client handlers configured to respond to requests from the client devices. In some examples, the client functionality may be implemented substantially as embedded hardware and/or software included within the display device 130 itself.

As discussed above, the MCPS 125 may include a communication interface configured to receive media content 105 from the media content provider 115. The MCPS 125 may further include an interface configured to receive input commands from a user input device. The user input device may include, for example, a remote control, keyboard, or any other suitable input device. The user input device may be configured to communicate with the MCPS 125 via a wireless link (e.g., an IR link), electrical connection, or any other suitable communication link.

In some examples, a remote control device may be configured to enable a user to provide various commands and other input signals for controlling various settings and operations of the MCPS 125, including control options related to the viewing of the media content 105. For example, rewind and fast-forward command may enable a user to access different scenes or frames within media content 105 stored in a live cache buffer. A record command may also be included which enables the user to designate as permanently recorded any instance of media content 105 buffered in the live cache buffer. A pause command may enable the user to pause an instance of media content 105. A program guide command may be configured to evoke the display of a program guide on the display device 130. Directional commands, for example specified by "left arrow", "right arrow", "up arrow", and "down arrow" buttons, may enable the user to navigate through various views and menus displayed on the display device 130 via the MCPS 125. In some cases, the MCPS 125 may include an interface configured to perceive or otherwise receive input gestures from a user (such as hand, head, eye, or body movements) and to determine input commands based on the received gestures.

In addition or in alternative to the remote control device, the system 100 may further include an adjunct device 135. The adjunct device 135 may be a computing device including one or more components capable of receiving input from a user, performing processing such as via a central processing unit (CPU), and providing output to the user of the device. Exemplary adjunct devices 135 may include the Apple iPad provided by Apple Corporation of Cupertino, Calif. as well as the HP Slate provided by Hewlett-Packard Corporation of Palo Alto, Calif.

The MCPS 125 may include an adjunct control interface 140 configured to provide bidirectional communications with the adjunct device 135. The communications transport used to provide communications between the adjunct control interface 140 of the MCPS 125 and the adjunct device 135 may take various forms including, but not limited to, infrared signals, radio signals, wireless local area networking (WLAN) based on the IEEE 802.11 standards, and Bluetooth communications developed and licensed by the Bluetooth Special Interest Group (SIG). Over the communications transport, the adjunct control interface 140 of the MCPS 125 and the adjunct device 135 may communicate in various forms, including Internet Protocol packets, application programming interface (API) calls, web service interfaces, and open or proprietary messaging protocols.

The adjunct control interface 140 may be configured to receive TV control information 145 for processing by the MCPS 125 and also to send TV state information 150 regarding the present status of the MCPS 125. Exemplary TV control information 145 may include commands such as increasing or decreasing volume, changing which instance of media content 105 is to be experienced, requesting TV state information 150 or IPG data 110 from the MCPS 125, and receiving any other user input from a device to be processed by the MCPS 125. Exemplary TV state information 150 may include what channel or instance of media content 105 is currently being displayed by the display device 130, the current volume or settings of the MCPS 125, IPG data 110 that is to be displayed by the adjunct device 135, and/or any other state information regarding the status of the MCPS 125 that is relevant to the adjunct device 135.

The adjunct device 135 may be implemented as a combination of hardware and software, and may include one or more software applications or processes for causing one or more computer processors to perform the operations of the adjunct device 135 described herein. A social TV application 155 may be one such application included on the adjunct device 135, and may be implemented at least in part by instructions stored on one or more non-transitory computer-readable media.

The social TV application 155 may be configured to provide a user interface 160 to allow for the operation and control of its functions by a user of the adjunct device 135. The social TV application 155 may further provide feedback and other output to the user through the user interface 160 to aid the user in making operational decisions with respect to the social TV system 100. The user interface 160 may make use of hardware and layered software included in the adjunct device 135, such as hardware and software keyboards, buttons, microphones, display screens, touch screens, lights and sound producing devices. Exemplary user interfaces 160 are illustrated in detail in FIGS. 2-14 discussed below.

The social TV application 155 may be configured to pair with (or be associated with, for control of) the MCPS 125, send TV control information 145 to the MCPS 125 by way of the adjunct control interface 140, and receive TV state information 150 from the MCPS 125 by way of the adjunct control interface 140.

The adjunct device 135 may further be in communication with one or more social networks 170. The adjunct device 135 may be in communication with the social networks 170 directly, or through the data center 165 such as via the web server 175. The social network 170 may be an online service, platform, or web site that allows for the building, display, and modification of a social graph of the relations among users of the system. The social network 170 may accordingly define a social structure of users who are tied to one another through various relationships, such as friendship, kinship, common interest, financial exchange, dislike, sexual relationship, beliefs, knowledge and/or prestige.

The social network 170 may further provide an application programming interface (API) configured to provide social networking information (such as the social graph) and functionality from the social network 170 for use in additional contexts. As some examples, Google Friend Connect and Facebook Connect provide functionality that allows website operators to incorporate functionality relating to a user's social graph onto their own websites. These services allow users to comment on the web operator's content, post those comments to the user's own profile pages, and share those comments with their friends on the social network 170. This social information may further be shared with a social TV application 155 in communication with the social network 170, such as by way of an open or proprietary social networking information API.

The data center 165 may include a web server 175, and the web server 175 may further be in communication with a database 180. Database 180 may be configured to store and retrieve information relevant to support of the addition of social networking functionality into the social TV system 100. As an example, to allow for the utilization of social network 170 information with subscribers of the media content system, the database 180 may include a mapping of social networking accounts of users on the social network 170 to accounts of subscribers of the media content system. The web server 175 may be configured to use this mapping of accounts of users on the social network 170 to accounts of MCPS 125 subscribers to determine which social network 170 information to provide to what adjunct devices 135.

The database 180 may further include preferences of the users, indications of which users are actively running the Social TV application 155, recent message histories of the users, identifiers of chat rooms in which the users are participating, and identifier of channels or instances of media content 105 currently being experienced by the subscribers. In other examples user preferences may be stored at least in part on the adjunct device 135.

Extensible Messaging and Presence Protocol (XMPP) is an open technology for real-time communication used over communication channels such as instant messaging, Voice over IP, real-time collaboration, social networking, microblogging, lightweight middleware, cloud computing, and others. The XMPP server 185 may be configured to utilize XMPP to provide presence information to the social TV application 155 relating to which users to the social television system 100 are presently online, away, or offline. The XMPP server 185 may further be configured to facilitate the sending and receiving of instant messages among users of the social TV application 155. An exemplary XMPP server 185 implementation may include use of the "ejabberd" messaging server software, distributed by ProcessOne of Paris, France.

The social information 190 may include friend lists or social graph information for the current user, which may then be manipulated locally by the social TV application 155. The social information 190 may further include the sending and receiving of chat messages to and from users of adjunct devices 135, the sending and receiving of presence information regarding users of the system, and the sending and receiving of invitations to private chats and viewings of instances of media content 105.

The adjunct device 135 and thus the social TV application 155 may be in communication with the web server 175 of the data center 165 to obtain social information 190. For example, the adjunct device 135 may use the web server 175 to query the database 180 for information relating to which users of the social network 170 are presently experiencing what media content 105. Using the social graph received from the social network 170 and the mapping of user accounts on the social network 170 to accounts of MCPS 125 subscribers, the data center 165 may thus facilitate the relating of which users of the social network 170 are presently experiencing what media content 105.

The adjunct device 135 and social TV application 155 may further be in communication with the XMPP server 185 to provide additional social networking features (i.e., user messaging, user online status, user invite) in addition to features relating to instances of media content 105 (i.e., browsing the IPG, experiencing an instance of media content 105, recording instances of media content 105, etc.). In some instances, the adjunct device 135 may also be configured to receive instances of media content 105, such as from media content provider 115 or another provider of media content.

Accordingly, and as described in greater detail below, through use of social information 190, the social TV application 155 may be configured to associate the adjunct device 135 with an account of a social network 170, receive social information 190 from the social network 170, augment IPG data 110 received from the MCPS 125, and display friend lists and IPG data 110 augmented by the social information 190.

In general, computing systems and/or devices, such as media content provider server 120, MCPS 125, adjunct device 135, web server 175, database 180 and XMPP server 185, may employ any of a number of computer operating systems, including, but by no means limited to, versions and/or varieties of the Microsoft Windows® and Windows Phone operating systems distributed by Microsoft Corporation of Redmond, Wash., the Unix operating system (e.g., the Solaris® operating system distributed by Sun Microsystems of Menlo Park, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices generally include computer-executable instructions and one or more processors, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, HTML 5, Java Script, Perl, Erlang, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and is accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above. Exemplary RMDBS implementations may include the Oracle database software provided by Oracle Corp. of Redwood Shores, Calif. and the Microsoft SQL Server software provided by Microsoft Corporation of Redmond, Wash.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. For instance, an MCPS 125 may be implemented via software as a "software" MCPS 125. In some cases, the software MCPS 125 may even be incorporated on the same device as the companion computing device, such that an adjunct device 135 may include and execute instructions both for a software MCPS 125 and also for a social TV application 155.

Figure 2:
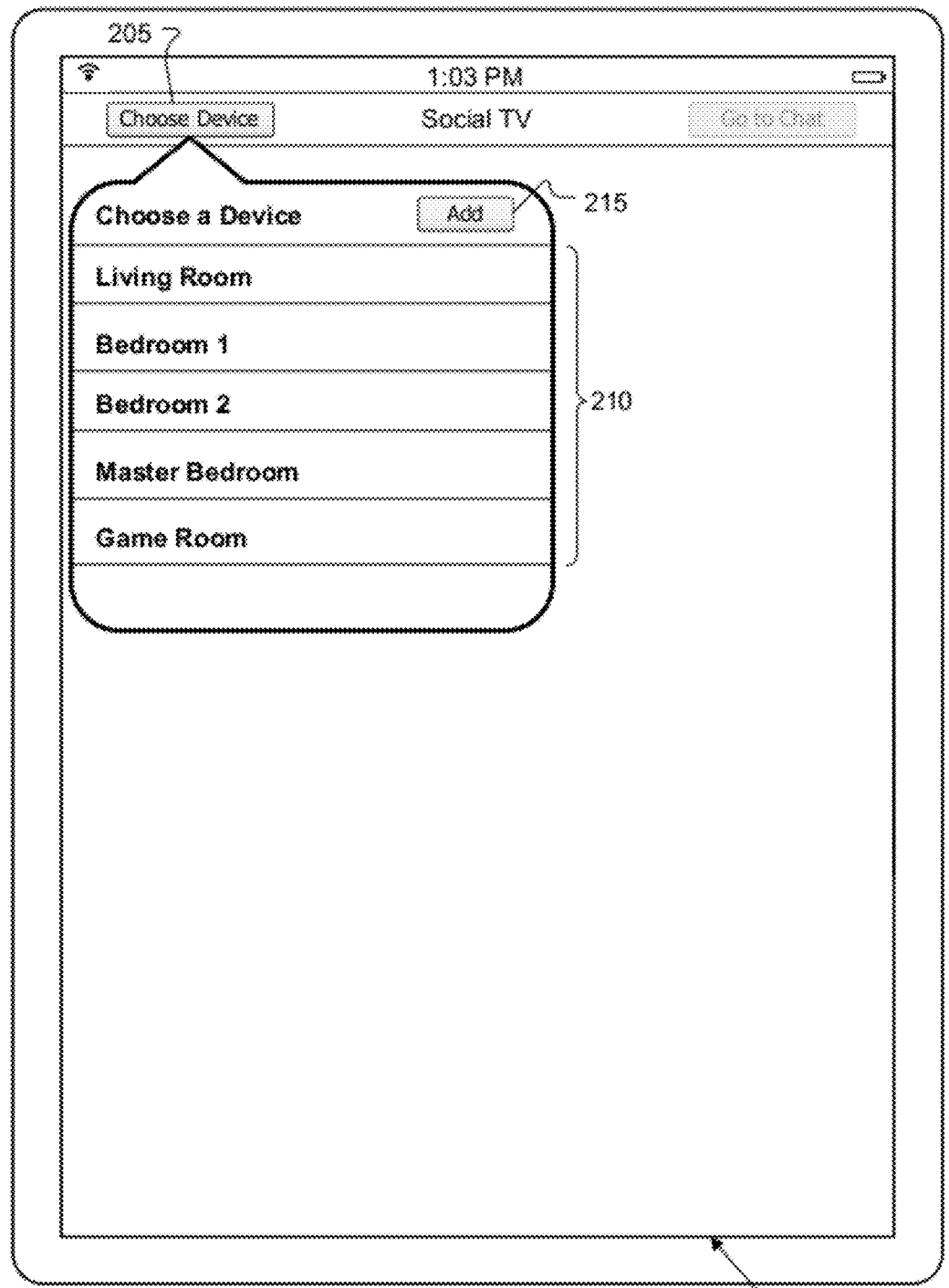
FIG. 2 illustrates an exemplary user interface configured to allow pairing of an adjunct device with a media content processing subsystem.

FIG. 2 illustrates an exemplary user interface 160-A configured to allow pairing of the adjunct device 135 with an MCPS 125. Pairing of the adjunct device 135 and MCPS 125 allows the adjunct device 135 to send TV control information 145 addressed to and with permission to command the MCPS 125, and also allows the MCPS 125 send TV state information 150 addressed to and with permission to command the appropriate adjunct device 135. As illustrated, the user interface 160-A includes an MCPS selector control 205, an MCPS menu 210 of MCPSs 125 available for pairing, and an add control 215 to facilitate the addition of an MCPS 125 not already included in the MCPS menu 210. The user interface 160-A may be provided by a social TV application 155 executed by the adjunct device 135.

A pairing process may be initiated the first time a device receives a connection request from a device with which it is not yet paired. In some examples, the pairing may be performed via Bluetooth communications between an adjunct device 135 and an adjunct control interface 140 of a MCPS 125. When performing pairing between the adjunct device 135 and an MCPS 125, the adjunct device 135 and/or the MCPS 125 may prompt the user to confirm the pairing process. In some examples, for security a user may be required to enter the same identification number or code into each device to be paired, or may be required to verify that both devices display an identical generated code. Once a pairing has been established it may be remembered by one or more devices, which may then be able to connect to each other when desired. As some examples, pairing information may be maintained by the adjunct device 135, the paired MCPS 125, a home gateway client-server MCPS 125 driving multiple display devices 130, or a media content provider 115 in communication with the subscriber site.

When pressed, the MCPS selector control 205 may be configured to display the MCPS menu 210. As shown the MCPS selector control 205 has been pressed and the MCPS menu 210 is displayed. The MCPS menu 210 may be further configured to indicate the current MCPS 125, if any, that is paired with the adjunct device 135. In some instances, the MCPS selector control 205 may be further configured to indicate the currently paired MCPS 125, if any, when the MCPS selector control 205 is in an un-pressed state.

The MCPS menu 210 may include a listing of MCPSs 125 that are available for pairing with the adjunct device 135. This listing may include one or more MCPSs 125 with which the adjunct device 135 has previously been paired. The user may select an MCPS 125 from the MCPS menu 210 to pair the adjunct device 135 with that MCPS 125. If an MCPS 125 not indicated in the MCPS menu 210 is desired by the user, the user may press the add control 215 to enter in details of a new MCPS 125 to add to the list, such as a name or label for the MCPS 125, an identifier of the MCPS 125 and/or a passcode of the MCPS 125 to allow for pairing of the adjunct device 135 with the MCPS 125. In some examples, the system 100 may support auto-discovery of MCPSs 125 within range of the Social TV application 155 running on the adjunct device 135. Nevertheless, the pairing operation may involve selection of an MCPS 125 to be associated with the Social TV application 155, and may further include an authentication step to prevent unauthorized access to subscriber MCPSs 125.

Once the adjunct device 135 is paired with an MCPS 125, the user interface 160 of the adjunct device 135 may be configured to display content supplementing that displayed by a display device 130 connected to the MCPS 125. If the adjunct device 135 is already paired with an MCPS 125, the user may also use the MCPS menu 210 to change the pairing of the adjunct device 135 to be paired with another MCPS 125.

Pairing may be performed with a related service offering (software and/or hardware) and does not necessarily imply association with a separate hardware device. For example, in cases where the MCPS 125 is implemented as software, pairing may occur between the social TV application 115 of the adjunct device 135 and the software MCPS 125 application of the adjunct device 135 that provides streaming live video, IPG, content authorization, and/or video playback functionality.

Figure 3:
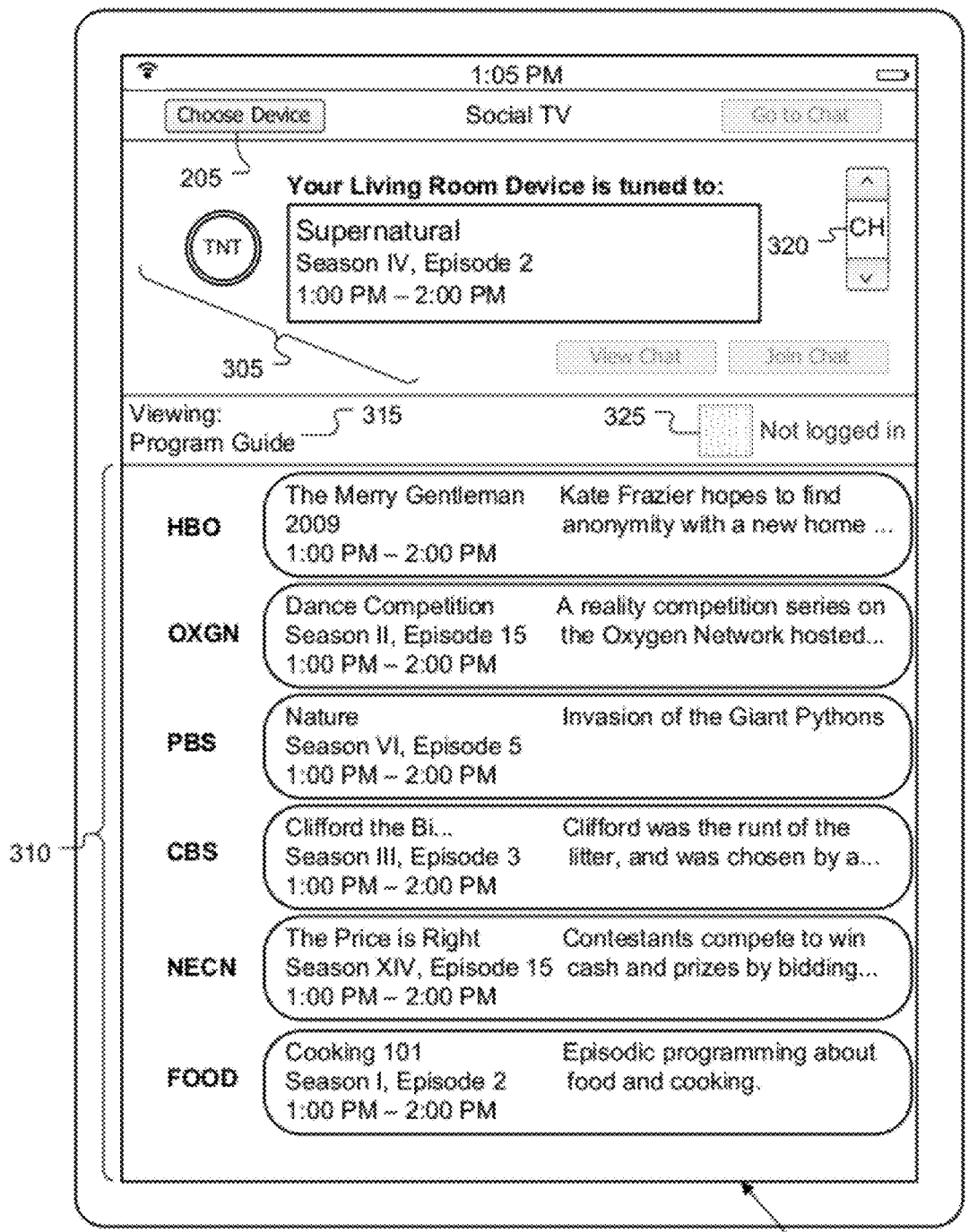
FIG. 3 illustrates an exemplary user interface of an adjunct device paired with a MCPS.

FIG. 3 illustrates an exemplary user interface 160-B of an adjunct device 135 paired with an MCPS 125. The user interface 160-B may be provided by a social TV application 155 executed by the adjunct device 135. The user interface 160-B may be configured to include TV state information 150 regarding what is being viewed by the paired MCPS 125, IPG data 110 for other media content 105 available to the MCPS 125, and controls 320 to allow for the manipulation of MCPS 125 functions such as channel selection and volume.

An informational display 305 may be configured to display information regarding the paired MCPS 125. For instance, the information display 305 may include a statement indicative of which MCPS 125 is currently paired with the adjunct device 135. As shown in FIG. 3, the exemplary statement "Your Living Room Device is tuned to" indicates that the MCPS 125 labeled or named as "Living Room" is presently paired with the adjunct device 135. Moreover, the information display 305 may further include additional information regarding what media content 105 is being provided by the MCPS 125. As some examples, the informational display 305 may be configured to display what channel and media content 105 are currently being experienced by a viewer of the display device 130, a short description of the media content 105 currently being experienced, the season and episode number of the media content 105 currently being experienced, and the logo of the channel currently being experienced. In some examples, the social TV application 155 may provide an option for hiding or toggling visibility of the informational display 305. This option may allow a user more screen space for other items when the informational display 305 is not desired.

To populate the information for the informational display 305, the social TV application 155 may receive the TV state information 150 from the adjunct control interface 140 of the MCPS 125. This information may be provided from the MCPS 125 automatically, such as when an adjunct device 135 is paired with the MCPS 125 and when the instance of media content 105 being experienced on the display device 130 changes. In some instances, the social TV application 155 may explicitly request the TV state information 150 from the MCPS 125, such as by way of a request formed into a TV control information 145 communication sent to the MCPS 125 from the adjunct device 135, via the adjunct control interface 140.

The social TV application 155 may further provide IPG data 110 in the user interface 160-B in the form of an IPG 310. As shown, the IPG 310 includes information corresponding to instances of media content 105 being broadcast, streamed, or otherwise available for being experienced by users. As shown, this information is organized according to channel, but this is only one possible arrangement of IPG data 110. The IPG 310 may further include detailed information for the instances of media content 105, such as title, subtitle, program summary, included actors, start and end time for broadcast, and any additional cost that may be incurred to view the instance of media content 105.

The user interface 160-B may further include a viewing indication 315 configured to inform the user that an IPG 310 is presently being displaying by the social TV application 155.

The user interface 160-B may further include channel controls 320 configured to allow a user to request the MCPS 125 to select different channels or media content 105 to be displayed. For example, the channel controls 320 may include channel up and channel down buttons that, when pressed, are configured to cause the social TV application 155 to send TV control information 145 communications to the paired MCPS 125 via the adjunct control interface 140 requesting the MCPS 125 to change the channel. The user interface 160-B may also allow a user to select an instance of media content 105 from the IPG 310, and may send TV control information 145 communications to the paired MCPS 125 to request the indicated channel change. The user interface 160-B may further include volume controls configured to allow a user to manipulate the volume level of the display device 130.

In addition to the display of IPG data 110 and information related to a paired MCPS 125, the social TV application 155 may further be associated with a user account on a social network 170. The user interface 160-B may include a social network status display 325. As shown in the social network status display 325, the adjunct device 135 is not presently logged into a social network 170. Accordingly, social networking functionality disabled in user interface 160-B.

Figure 4:
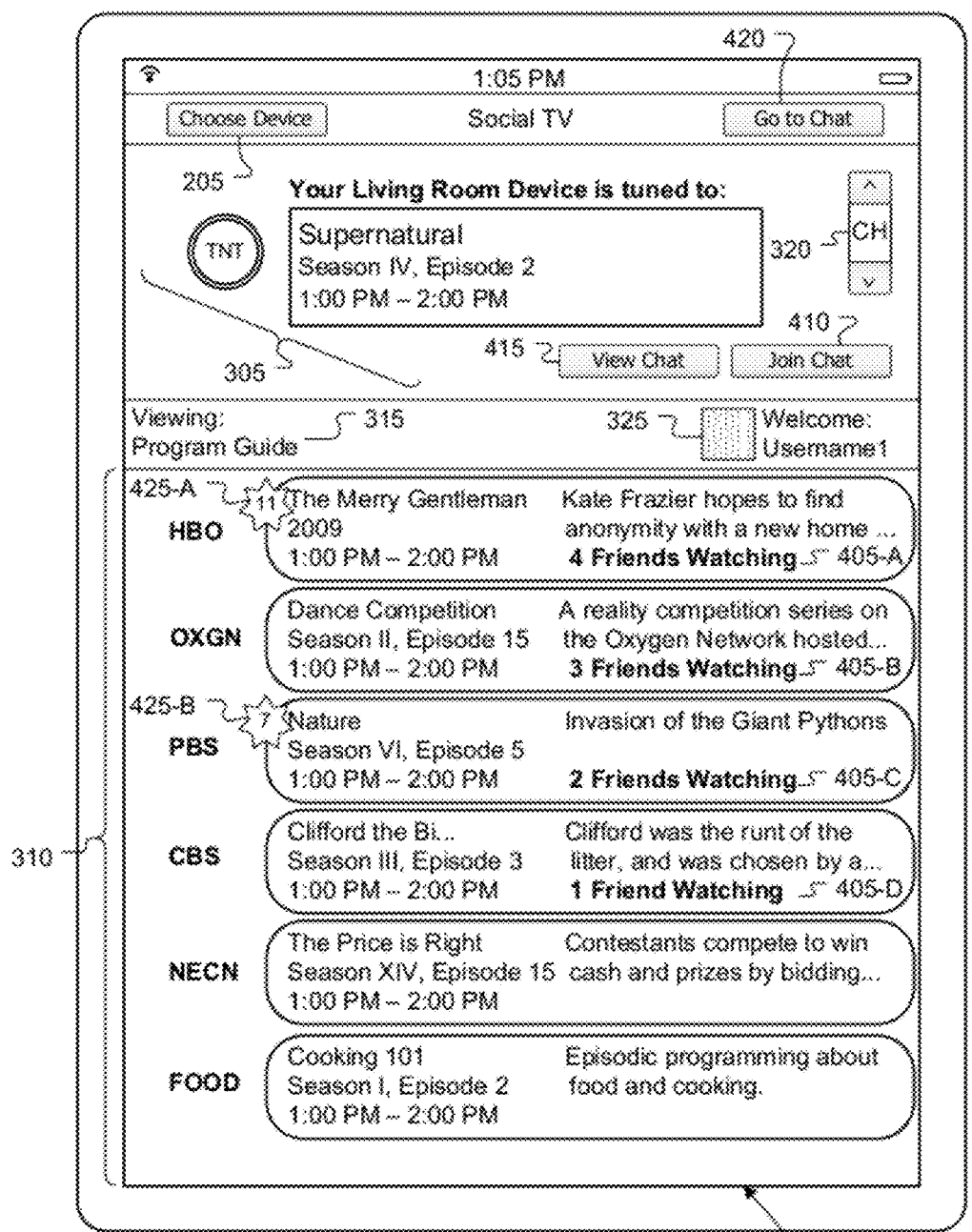
FIG. 4 illustrates an exemplary user interface of an adjunct device paired with a MCPS and logged into a social network.

FIG. 4 illustrates an exemplary user interface 160-C of an adjunct device 135 paired with an MCPS 125 and logged into a social network 170. In addition to the functionality described above in FIG. 3, because the adjunct device 135 illustrated in FIG. 4 is logged into a social network 170, the social TV application 155 may receive and use social graph information from the social network 170 to augment the information displayed in the user interface 160.

In addition to being paired with an MCPS 125, the social TV application 155 may further be associated with a user account on a social network 170. For example, the social TV application 155 may be configured to receive login information such as username and password from the user, and may use the login information to provide access to the user's account on a social network 170. The social TV application 155 may be configured to communicate with an API of the social network 170 by way of one or more social information requests 190, the social information requests 190 being configured to request information from the social network 170 to which the user is a member. This association of the MCPS 125 or adjunct device 135 with an account on the social network 170 may be stored and maintained by the data center 165, such as by database 180.

Once the social TV application 155 of the adjunct device 135 has been associated with the account of the social network 170, the social TV application 155 may then use social information 190 to augment IPG data 110 received from the MCPS 125. The social information 190 may include a listing of the user's friend list from the user's social networking account. Additionally, the social information 190 may include a mapping of friends of the associated user account on the social network 170 to subscriber accounts of the media content system (e.g., including social information 190 received from web server 175), and presence information for users of the social TV application 155 (e.g., including social information 190 received from XMPP server 185). Accordingly, the user interface 160-C of the adjunct device 135 may be augmented with social networking functionality to allow the user logged into the social network 170 to determine what his or her friends are watching and message with his or her friends within the context of the social TV application 155.

As shown in FIG. 4, the user interface 160-C may include a social network status display 325 configured to display information regarding the social network 170 account with which the adjunct device 135 is presently associated. When the user is logged into a social network 170 account, the social network status display 325 may include information such as the username of the user account on the social network 170 as well as a profile picture from the social network 170 associated with the user.

The social TV application 155 may receive information (e.g., from web server 175 and/or XMPP server 185) relating to which friends of the user logged into the social network 170 are also online, which instances of media content 105 those friends are currently watching, which chat rooms those friends have joined, which chat rooms those friends are currently viewing, and recent chat messages with those friends. Using this information, the IPG 310 may be augmented with information relating to which instances of media content 105 friends of the logged in user are presently are watching or discussing. Such additional information may accordingly provide a user with a mechanism to socially interact in substantially real-time while experiencing media content 105, while also gaining a sense of what shows are popular with friends in his or her social graph.

One way of providing this additional information to the user is to include popularity indications 405 in the IPG 310 indicative of how many of the user's friends have joined a chat room for an instance of media content 105. For example, a popularity indication 405-A may augment the listing of "The Merry Gentlemen" to indicate that a chat room associated with a particular instance of media content 105 instance has been joined by four of the user's friends. Additionally, a popularity indication 405-B may indicate that three friends are messaging regarding OXGN, a popularity indication 405-C may indicate that two friends are messaging regarding PBS, and a popularity indication 405-D may indicate that one friend is in the chat room for CBS. The IPG 310 may also be sorted according to the number of the user's friends who are messaging (i.e., chatting), to allow the user of the adjunct device 135 to easily see which chat rooms and shows are the most popular within his or her social group.

In other examples, popularity indications 405 may be used to indicate the number of friends who are presently viewing an instance of media content 105, rather than the number of friends who have joined a chat room corresponding to the instance of media content 105. However, freely providing information regarding the media content 105 being viewed by users of the system 100 may be considered an invasion of privacy by some users, as those users may consider their selection of media content 105 to be private information. Accordingly, the active chat room for a friend may be used instead to indicate what content a friend is currently experiencing. As another approach, a friend may be required to opt-in to making available his or her information regarding media content 105 being experienced.

A join chat 410 control may allow the user of the adjunct device 135 to participate in the chat room corresponding to the instance of media content 105 presently being experienced. In some instances, the chat room may include only friends of the user who have joined the chat room. Who should be considered as friends of the user may be determined based on the social graph of the social network 170. In other instances the chat room may include a wider range of users, such as friends of the user plus friends of friends who have joined the chat room, or all users of the social network 170 who are messaging regarding the same instance of media content 105.

A view chat control 415 may allow the user of the adjunct device 135 to view a chat room corresponding to the instance of media content 105 presently being experienced by a user of the MCPS 125. In some implementations, a user may view a chat room without joining the room. However, when the user is viewing the chat room as opposed to joining, the user may be invisible to those who have joined the chat room. The user who is only viewing may not contribute messages to the chat room unless and until that user joins the chat room.

A go to chat control 420 may allow the user to switch to a chat mode and view a list of the chat rooms he or she has already joined. Because a user may join more than one chat room, the list of chat rooms may be beneficial in allowing a user to switch among the multiple chat rooms in which he or she is taking part. Further details of the chat room user interface 160 are discussed below with respect to FIGS. 9-10.

Continuing with FIG. 4, to enable a user to readily determine which chat rooms include new messages, the IPG 310 may be augmented with new message indicator 425 configured to illustrate to a user whether new messages are available in a chat room. The new message indicator 425 may further indicate how many new messages have become available. These new message indicators 425 accordingly provide the user with a notification of when there is additional content in the chat room so that the user does not need to switch around to determine whether there are any new messages. As shown in FIG. 4, eleven new messages are available in a chat room for the "The Merry Gentlemen" instance of media content 105 and seven new messages are available in a chat room for the "Nature" instance of media content 105.

Figure 5:
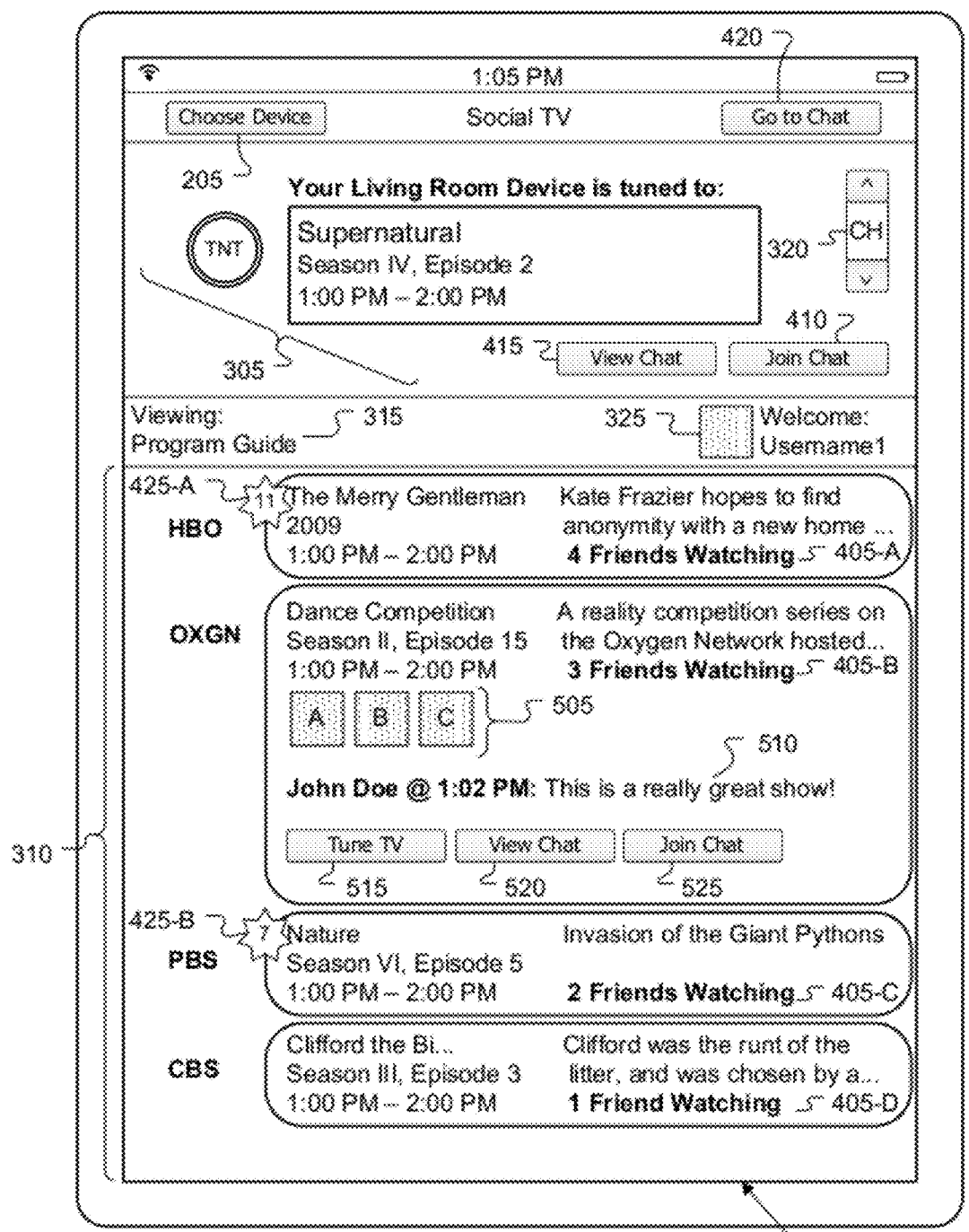
FIG. 5 illustrates an exemplary user interface of an adjunct device including additional information about a selected instance of media content.

FIG. 5 illustrates an exemplary user interface 160-D of an adjunct device 135 including additional information about a selected instance of media content 105. An instance of media content 105 may be selected by a user through the user interface 160-D. For example, selection may be performed by user interactions including clicking, touching, scrolling to, or otherwise indicating selection by the user of the adjunct device 135 via the user interface 160-D. Once selected, the selected instance of media content 105 in the IPG 310 may be expanded to include additional information from the social network 170.

As shown in user interface 160-D, the instance of media content 105 corresponding to a dance show on the OXGN channel has been selected by the user. The IPG 310 entry corresponding to that instance of media content 105 has accordingly been expanded in size to include additional information about the selected instance of media content 105. The additional information may include profile pictures 505 of friends who are also viewing or messaging about the selected instance of media content 105, the most recent chat message 510, and additional controls such as a tune TV control 515, a view chat control 520, and a join chat control 525.

The profile pictures 505 of friends who are viewing or messaging regarding the instance of media content 105 may be received by way of the social information 190 communicated to the adjunct device 135. For example, the social TV application 155 may receive the profile pictures 505 via an API made available by the social network 170. In another illustrative example, the social TV application 155 may receive profile pictures 505 from the web server 175, where the profile pictures 505 were previously obtained from the social network 170 and cached in the database 180. The inclusion of profile pictures 505 in the expanded region may serve to give a quick indication to the user of who else is viewing or messaging regarding the expanded instance of media content 105.

The expanded item region may further include the most recent chat message 510 from the chat room associated with the instance of media content 105. This most recent chat message 510 may be received, for example, by way of the social information 190 communicated from the XMPP server 185 to the adjunct device 135.

The expanded item region may further include a tune TV control 515 configured to tune the MCPS 125 to the instance of media content 105, a view chat control 520 configured to allow the user to view a chat room for the instance of media content 105, and a join chat control 525 configured to allow the user to join the chat room for the instance of media content 105.

Similar to as described above with respect to the join chat 410 control and view chat 415 controls in FIG. 4, the view chat control 520 and join chat control 525 may likewise be configured to allow the user to view and join a chat room for the instance of media content 105. The tune TV control 515 may be configured to allow the user to request the paired MCPS 125 to provide the selected instance of media content 105 on the display device 130.

Figure 6:
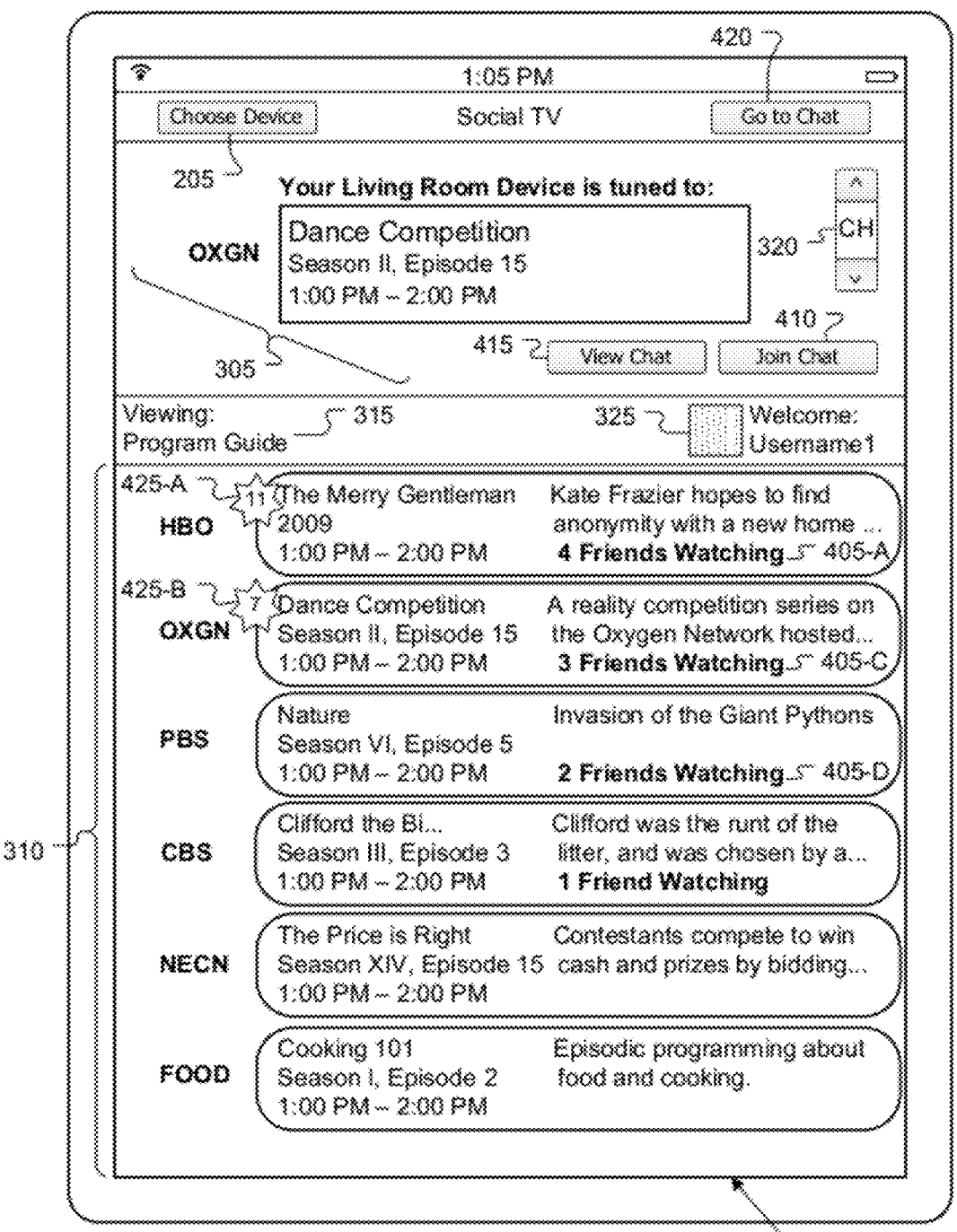
FIG. 6 illustrates an exemplary user interface of an adjunct device after having tuned to a different instance of media content.

FIG. 6 illustrates an exemplary user interface 160-E of an adjunct device 135 after having tuned to a different instance of media content 105. For example, a user may have selected the tune TV control 515 included in the expanded region for the "Dance Competition" media content 105 instance to change the channel from TNT to OXGN. As shown in the user interface 160-E, the informational display 305 has been updated to display information regarding the "Dance Competition" instance of media content 105.

Figure 7:
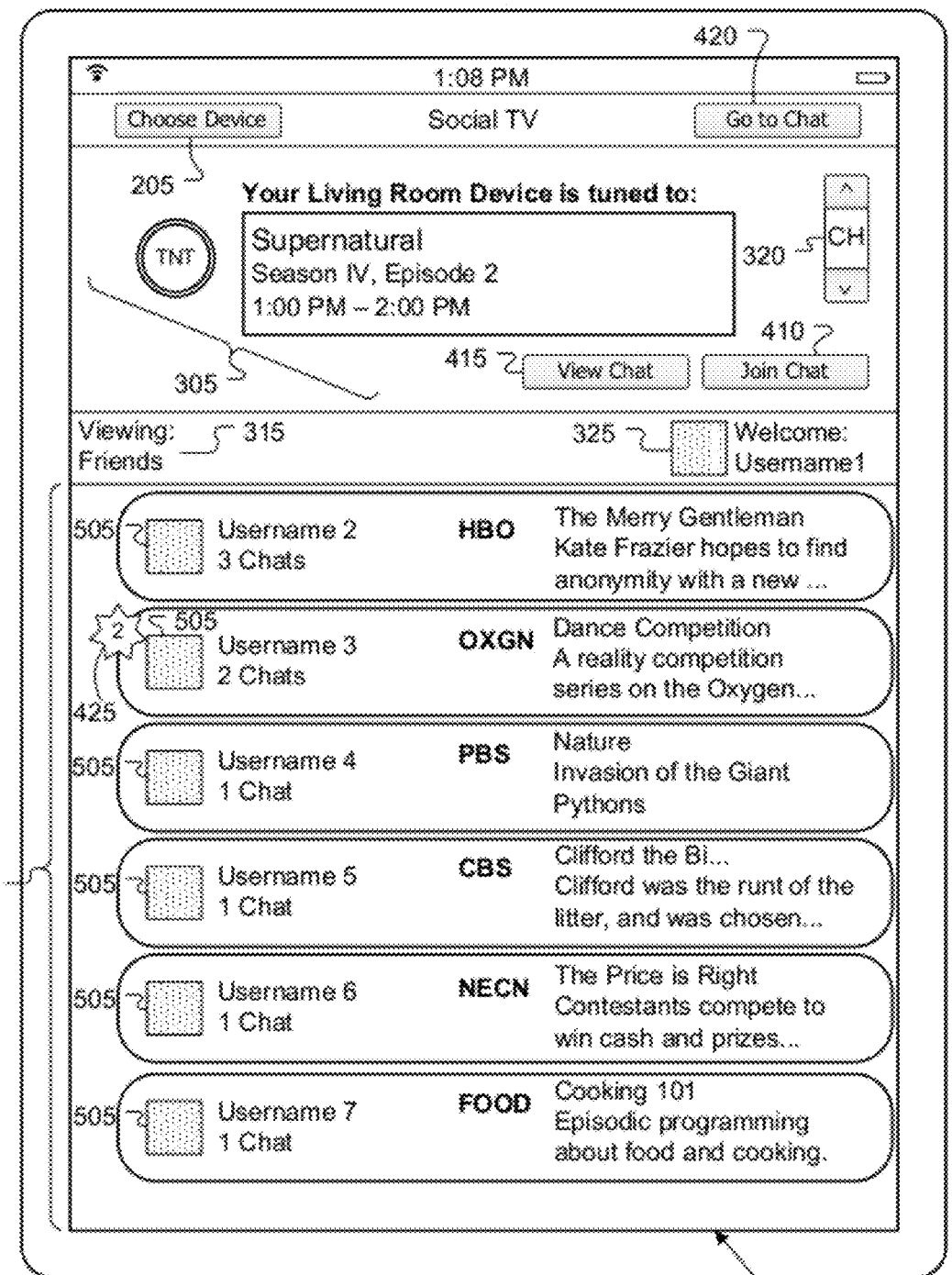
FIG. 7 illustrates an exemplary user interface of an adjunct device including a friend list.

FIG. 7 illustrates an exemplary user interface 160-F of an adjunct device 135 including a friend list 705. Rather than merely displaying an interactive program guide, the social TV application 155 may further be configured to display a friend list 705 including the user's social network 170 friends.

The friend list 705 may be augmented with presence information relating to which friends are online or offline. For example, the friend list 705 may be sorted with online friends being indicated first, followed by friends that are offline (if the user has opted to show offline friends). The friend list 705 may further be sorted such that friends indicated as being away are listed between those who are online and those who are offline. Within the online, away, and offline listings of friends, the friend list 705 may further be sorted using a secondary sort such as alphabetically by name, or in other alternatives by channel number, number of concurrent chats that friend is participating in, and friends with the most recent chats. Profile pictures 505 may further be utilized to allow for easy indication of which friends are currently experiencing or messaging about what media content 105. The friend list 705 may accordingly allow a user of the adjunct device 135 to more easily locate and interact with the user's friends in the social TV system 100.

The social TV application 155 may provide an option to allow a user to select between an IPG 310 view such as user interface 160-E, or a friend list 705 view such as user interface 160-F. As an example, these two modes may be toggled or alternated by selection of the viewing indication 315.

Similar to as discussed above, if a friend has provided additional messages that have not yet been viewed, a new message indicator 425 may be included in the user interface 160-F in association with a friend in the friend list 705 to illustrate to the user that new messages are available from that friend.

Figure 8:
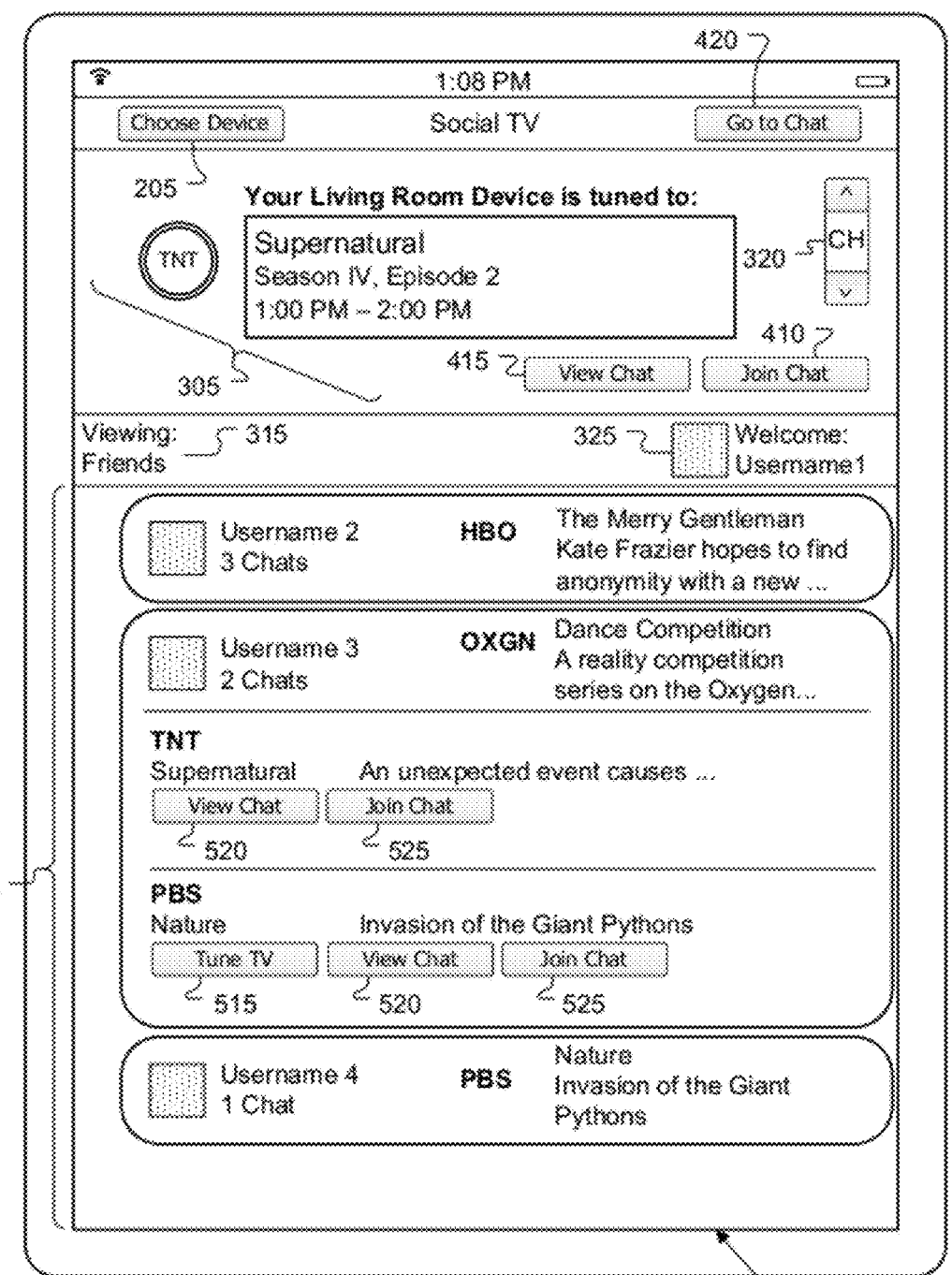
FIG. 8 illustrates an exemplary user interface of an adjunct device including additional information about a selected friend in a friend list.

FIG. 8 illustrates an exemplary user interface 160-G of an adjunct device 135 including additional information about a selected friend in a friend list 705. Similar to as discussed above with respect to media content 105 instances, a friend may be selected by a user through the user interface 160-G, and may be expanded to include additional information about the friend from the social network 170.

Because a friend may be involved in multiple chat rooms, the expanded friend region may include a listing of each of the chat rooms that the expanded friend is viewing or has joined. The first item in this list may indicate which instance of media content 105 the friend is currently messaging about or experiencing, while the remaining entries may indicate the other chat rooms in which the friend is taking part. For each of the listed instances of media content 105 for the friend, the expanded friend region may further include tune TV controls 515 configured to tune the MCPS 125 to instances of media content 105, view chat controls 520 configured to allow the user to view a chat room for the instance of media content 105, and join chat controls 525 configured to allow the user to join the chat room for the instance of media content 105. If the user is already experiencing a particular instance of media content 105, then no tune TV control 515 may be provided for that particular instance of media content 105.

Figure 9:
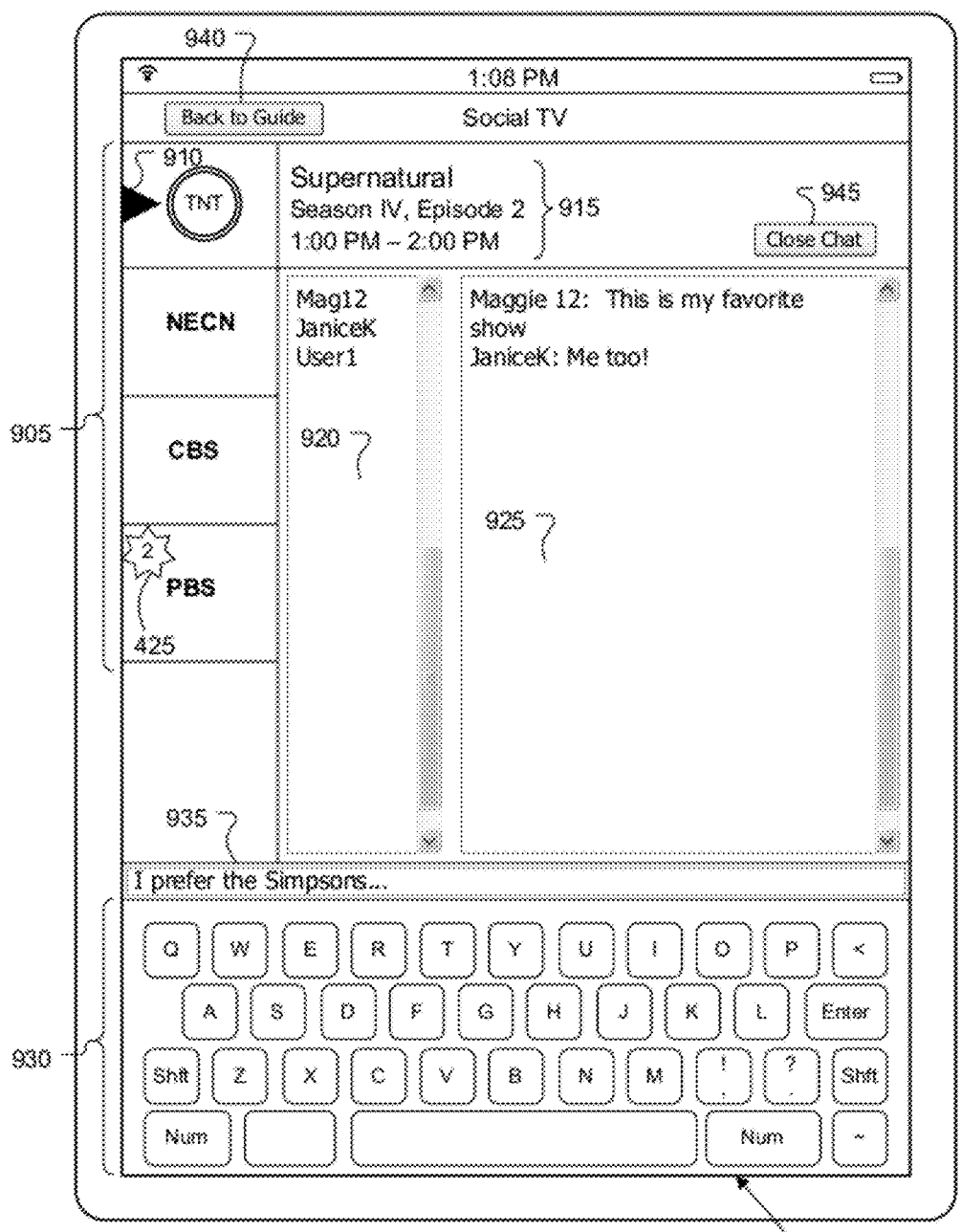
FIG. 9 illustrates an exemplary user interface of an adjunct device illustrating a chat MOM.

FIG. 9 illustrates an exemplary user interface 160-H of an adjunct device 135 illustrating a chat room view of the social TV application 155. A user may enter the chat room user interface 160-H in various ways, including by selection of the chat control 420 included in the IPG 310, or by selection of the view chat 415 or 520 or join chat 410 or 525 controls appearing in one of the IPG 310 views of the user interface 160.

The chat room user interface 160-H may include a listing of chat rooms 905. The listing of chat rooms 905 may include all the chat rooms that the user has selected to join or view. The listing of chat rooms 905 may provide for scrolling in instances where more chat rooms are to be displayed than reasonably fit within the allotted space. The listing of chat rooms 905 may further include an indication 910 of the current chat room being displayed. As shown, the chat room for "Supernatural" on TNT is currently being displayed. While the indication 910 is illustrates in FIG. 9 as a triangular shape, in other instances the indication 910 of the current chat room may be indicated by shading, highlighting, underlining or some other indication of which chat room is the currently active room.

When a user enters the chat room user interface 160-H by selection of the chat control 420, the initial chat room that is selected in the listing of chat rooms 905 may default to the instance of media content 105 currently being tuned to by the MCPS 125 paired with the adjunct device 135. In other instances, the last chat room in which the user was participating may be selected by default. In still other instances, where the user enters the chat room user interface 160-H by selection of a view chat 415 or 520 or join chat 410 or 525 control, the user interface 160-H may open to the selected chat room.

Similar to the informational display 305 configured to display information regarding what is being shown by the MCPS 125, the chat room user interface 160-H may likewise include information regarding the current instance of media content 105 being discussed in the selected chat room. For example, the informational display 915 illustrated in FIG. 9 includes details regarding the current instance of media content 105 for the displayed the chat room for "Supernatural" on TNT.

The chat room user interface 160-H may further include a listing of friends 920 who are also in the chat room. The listing of friends 920 may include friends of the user logged into the social network 170 who are also online. Who should be considered as friends of the user may be determined based on the social graph received from the social network 170. Moreover, presence information regarding which users are online may be determined through use of the XMPP server 185 and a mapping of social networking user accounts and subscriber accounts stored by the database 180. In some instances, the listing of friends 920 may include a wider range of users, such as all friends plus friends of friends who have joined the chat room, or even all users of the social network 170 who are messaging regarding the same instance of media content 105.

The chat room user interface 160-H may further include a chat window 925. The chat window 925 may include message text received from the various chat participants of the chat room. The chat window 925 may further include indications of which messages correspond to which chat room participants, as well as the timestamp of each message. To allow the user of the adjunct device 135 to contribute to the chat, the chat room user interface 160-H may further include a keyboard control 930 (or other input control) configured to allow a user to input a chat message 935 into the current chat room. Once the user has entered a new chat message 935, the adjunct device 135 may send off the chat message 935 to be applied to the chat room (e.g., as social information 190 sent to the XMPP server 185).

When the user of the adjunct device 135 no longer chooses to remain in the current chat room, the user may select a back-to-guide control 940 to return to the IPG view of the user interface 160. However, returning to the IPG view of the user interface 160 may not necessarily cause the user to leave the chat rooms in which he or she is taking part. Rather, the user may instead be marked as being away from the chat room so that other participants of the chat room are aware that they should not expect an immediate response.

Users who are away may be indicated as being away in the listing of friends 920, such as by being indicated in italics or in a different color. In some instances, the user interface 160 may provide an explicit option to allow a user to choose an away or available status. In still other instances, presence information regarding the users may be obtained through social information 190 communications configured to retrieve presence information from the social network 170, database 180, and/or an XMPP server 185.

In any event, if the user no longer chooses to remain in the current chat room, the user may select a close chat control 945 to exit the chat room. If the user desires to rejoin the chat room, the user may then find the chat room again in the IPG view of the user interface 160, and rejoin the chat room.

As another option, a user who no longer desires to remain in the current chat room may switch to another chat room. As shown in the example of FIG. 9, the user interface 160-H includes tiles for chat rooms for NECN, CBS and PBS. The user may select one of those tiles, and may accordingly switch to the selected chat room. Similar to as discussed above, if a chat room includes additional messages that have not yet been viewed, a new message indicator 425 may be included in the associated tile to illustrate to the user that new messages are available in the associated chat room. The new message indicator 425 may further indicate how many new messages have become available. For example, the new message indicator 425 for the PBS chat room indicates that there are two unread messages in that chat room. While the tiles in user interface 160-H are named according to channel name, in other examples additional or different information may be included in the tiles, such as program names or episode names of the associated instances of media content 105 being discussed.

Figure 10:
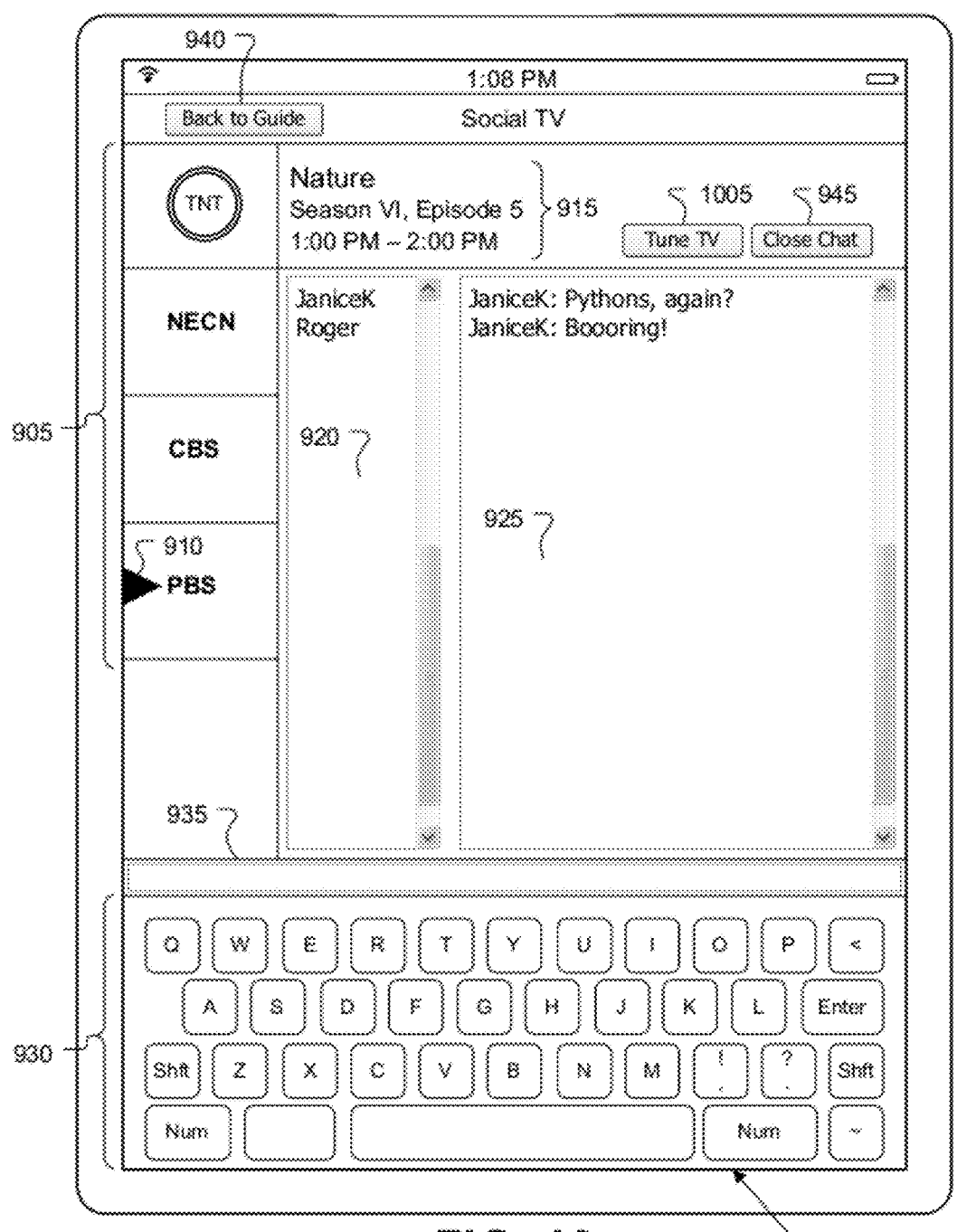
FIG. 10 illustrates an exemplary user interface of an adjunct device switched to another chat room.

FIG. 10 illustrates an exemplary user interface 160-I of an adjunct device 135 switched to another chat room. Compared to user interface 160-H, in user interface 160-I the user has selected to change to the current chat room from the chat room for "Supernatural" on TNT to the chat room for "Nature" on PBS. The indication 910 of the current chat room and the informational display 915 have been updated to reflect the change, and the new message indicator 425 for the PBS chat room has been cleared as the two new messages for that chat room are now displayed in the chat window 925.

Because switching chat rooms does not necessarily switch the instance of media content 105 currently being experienced on display device 130, the user interface 160-I may further provide a tune TV control 1005 that when selected is configured to tune the MCPS 125 paired with the adjunct device 135 to the instance of media content 105 associated with the chat MOM.

In some instances, the system 100 may include a user setting that provides for automatic tuning to the instance of media content 105 whose associated chat is activated by the user. In this "autotune" mode, the system may have a tighter coupling of the adjunct device 135 to the display device 130, thereby allowing the media content 105 being displayed on the display device 130 to match the context of the user on the adjunct device 135. The "autotune" mode may be turned off by the user, to allow the user to once again change chat rooms without affecting the instance of media content 105 being displayed by the display device 130.

In some instances, a user may desire to invite other users to join him or her for a chat. For example, the user may invite one or more of his friends to take part in a chat room for an instance of media content 105 that is presently viewable, or that may become available at an indicated time. The user interface 160 may accordingly provide a facility for a user to select the friends to chat with and the instance of media content 105 with which the chat may be associated. In some examples, the user may set up a private chat solely between the invited participants that cannot be viewed or joined by other users of the system 100.

Figure 11:
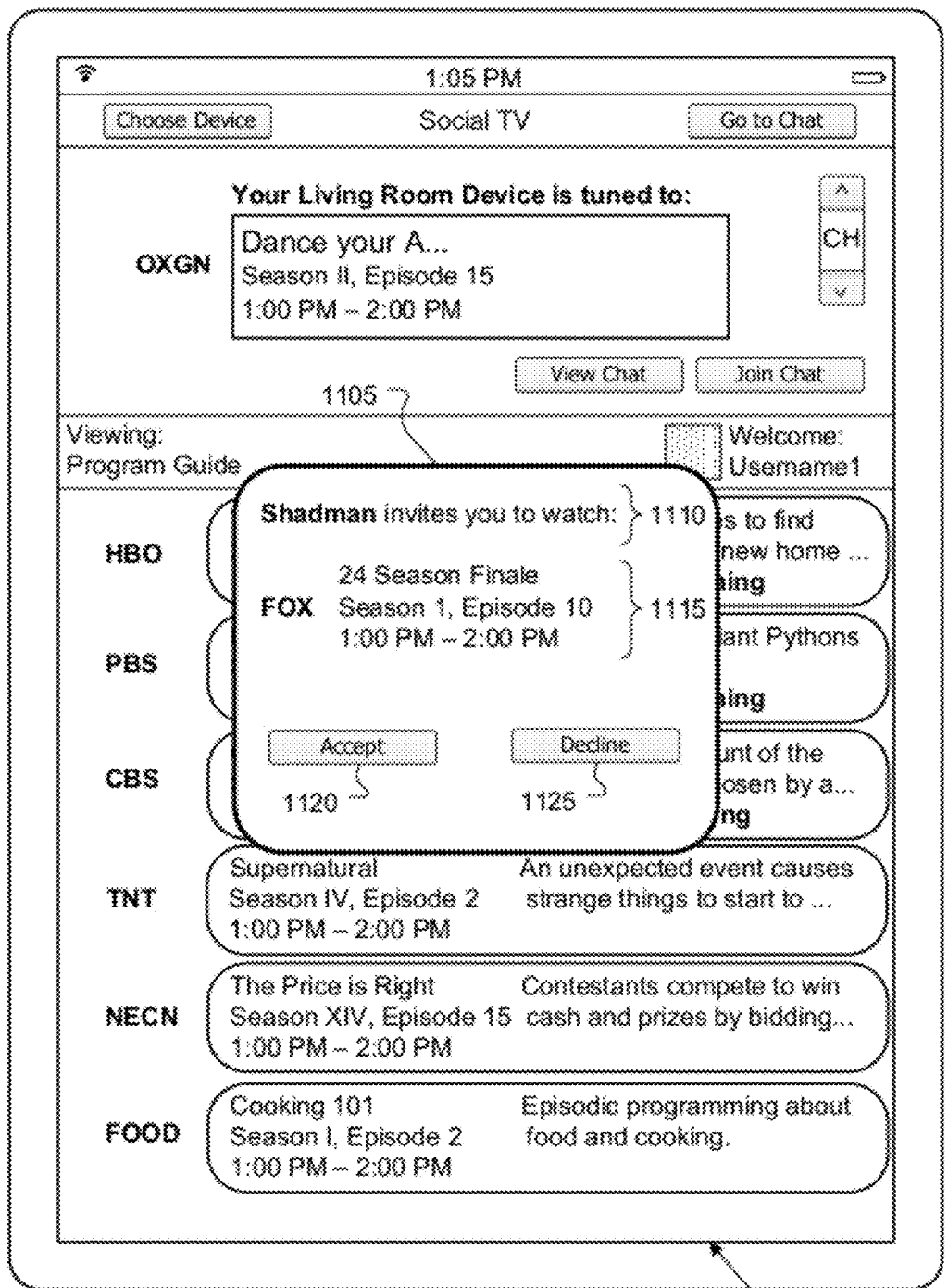
FIG. 11 illustrates an exemplary invitation from a friend inviting the user to watch an instance of media content.

FIG. 11 illustrates an exemplary invitation from a friend inviting the user to watch an instance of media content 105. As shown in user interface 160-J, the invitation 1105 includes a from-whom indication 1110 of the friend who sent the indication, an informational display 1115 configured to include information regarding the same instance of media content 105 the user is being invited to watch, an accept control 1120 to allow the user to accept the invitation 1105, and a decline control 1125 to allow the user to decline the invitation 1105. If the user chooses to accept the invitation, the user may be joined into the appropriate chat room. In some cases, if the associated instance of media content 105 has not yet begun, the user may be joined into the appropriate chat room when the instance of media content 105 is ready to begin. Users may further be able to send invitations to other users who are not currently logged into the social TV application 155. In such a case, the system 100 may use e-mail, an SMS message, a social network message, and/or a voice portal call to deliver the invitation to the invited user and record the response (i.e., to accept or decline the invitation).

Figure 12:
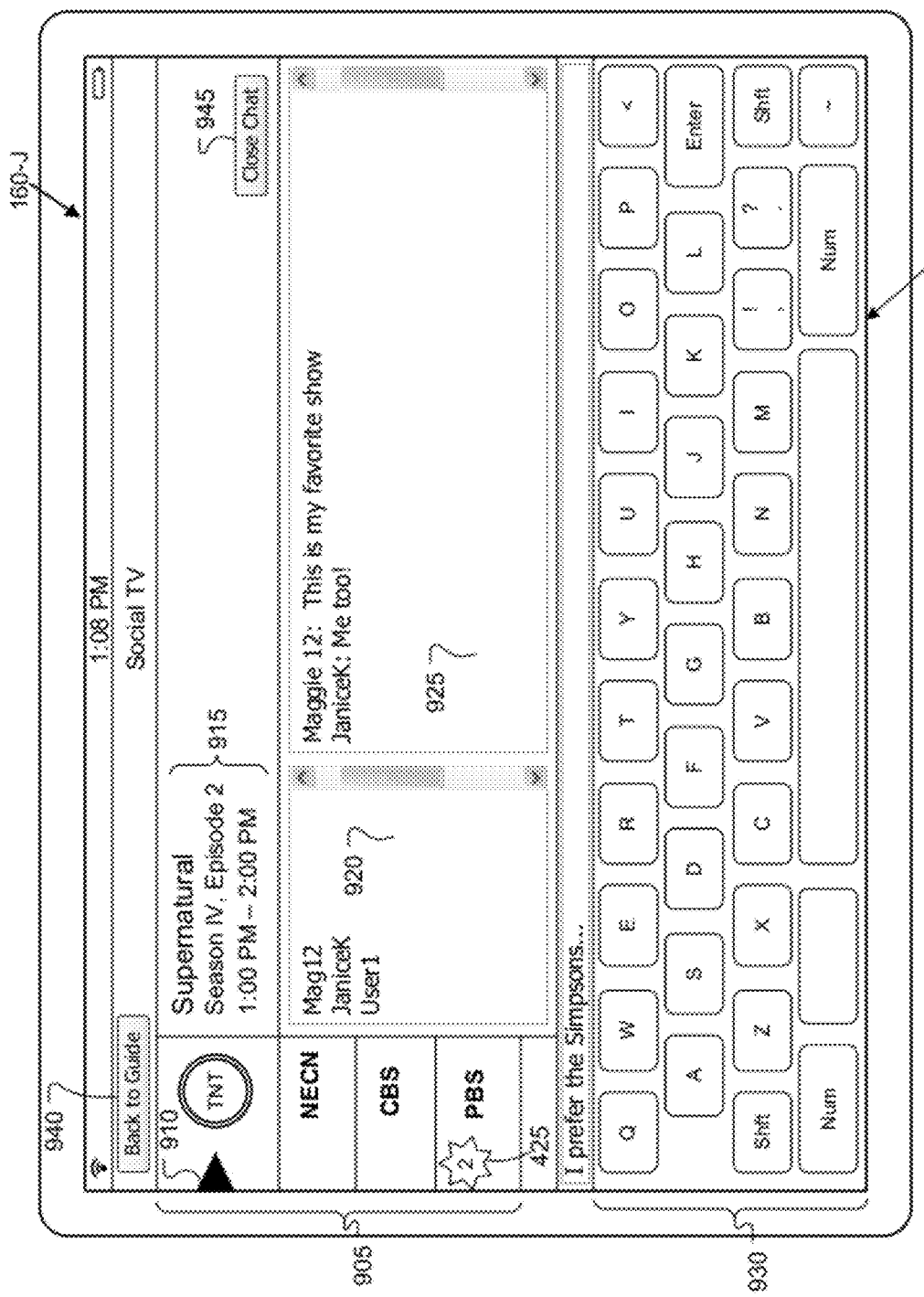
FIG. 12 illustrates an exemplary user interface of an adjunct device provided in a landscape view.

While the exemplary user interfaces 160-A through 160-J are each illustrated in a portrait view, other orientations and designs are possible. As an example, FIG. 12 illustrates an exemplary user interface 160-K of an adjunct device 135 provided in a landscape view rather than a portrait view. User interface 160-K of FIG. 12 generally corresponds to the user interface 160-H of FIG. 9, but arranged with the keyboard control 930 across the wider edge as opposed to the narrower edge. The adjunct device 135 may orient the user interface 160 according to the orientation of the screen of the adjunct device 135 to ensure that the content properly faces the user, while also providing user flexibility in the viewing arrangement.

Figure 13:
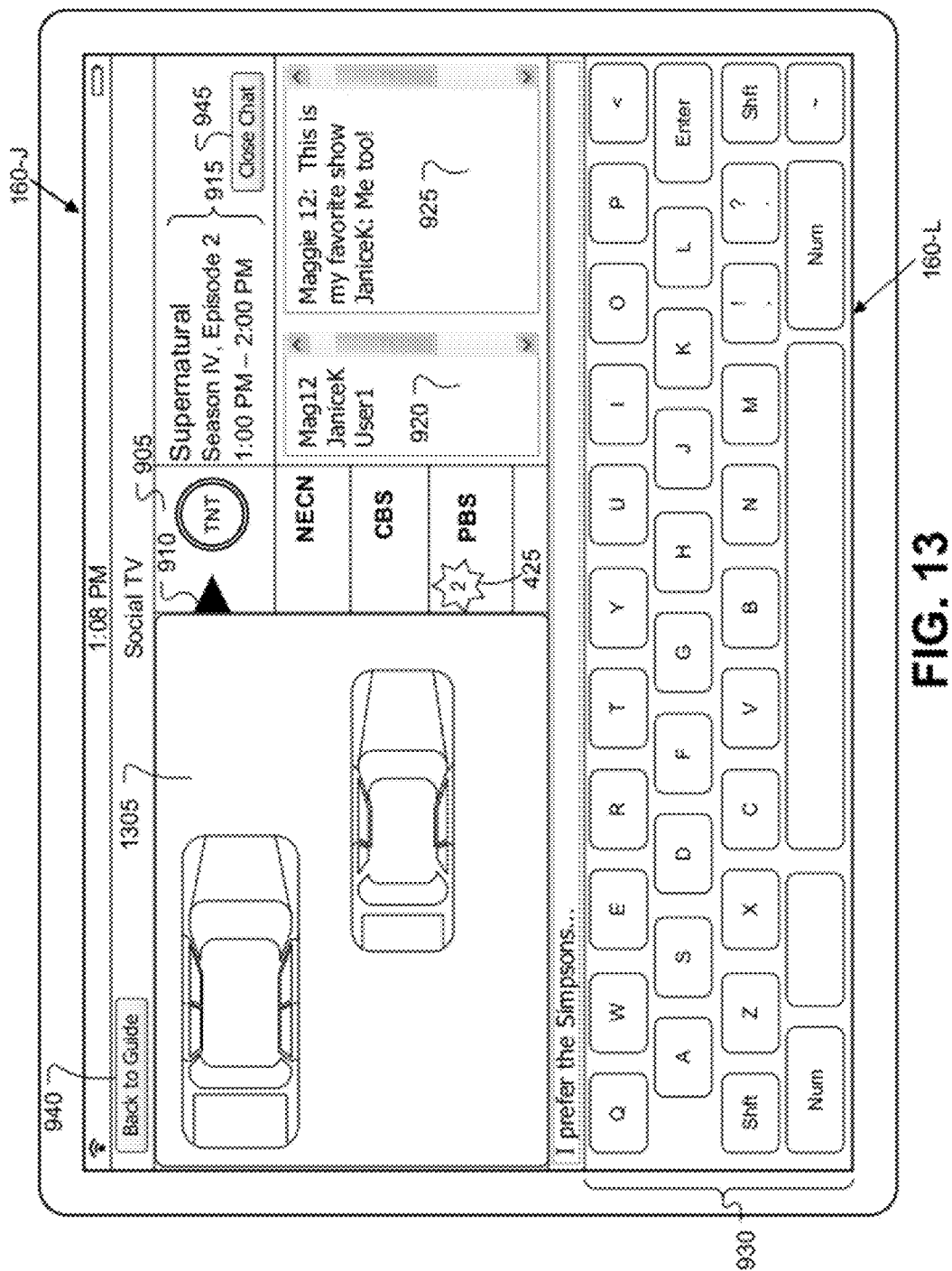
FIG. 13 illustrates an exemplary user interface of an adjunct device further including a streaming media pane configured to display media content.

FIG. 13 illustrates an exemplary user interface 160-L of an adjunct device 135 further including a streaming media pane 1305 configured to display media content 105. In such an example, the user may utilize the adjunct device 135 to display both media content 105 and also one or more of an IPG 310 user interface 160, a friends view user interface 160, and a chat room user interface 160. The streaming media pane 1305 may receive media content 105 from media content provider 115, and may accordingly provide the media content 105 to the adjunct device 135 instead of or in addition to providing the media content 105 to the display device 130. The streaming video may be provided to the adjunct device 135 through a media content provider server 120 of the media content provider 115, from the paired MCPS 125 via the adjunct control interface 140, or from some other video server over the Internet, as some examples. In some instances, enhanced streaming video functionality may be provided to users only for an upcharge. In other instances, enhanced streaming video functionality may only be provided to users who are also subscribers of bundled services, such as a bundle of services including both high-speed internet and television services.

Figure 14:
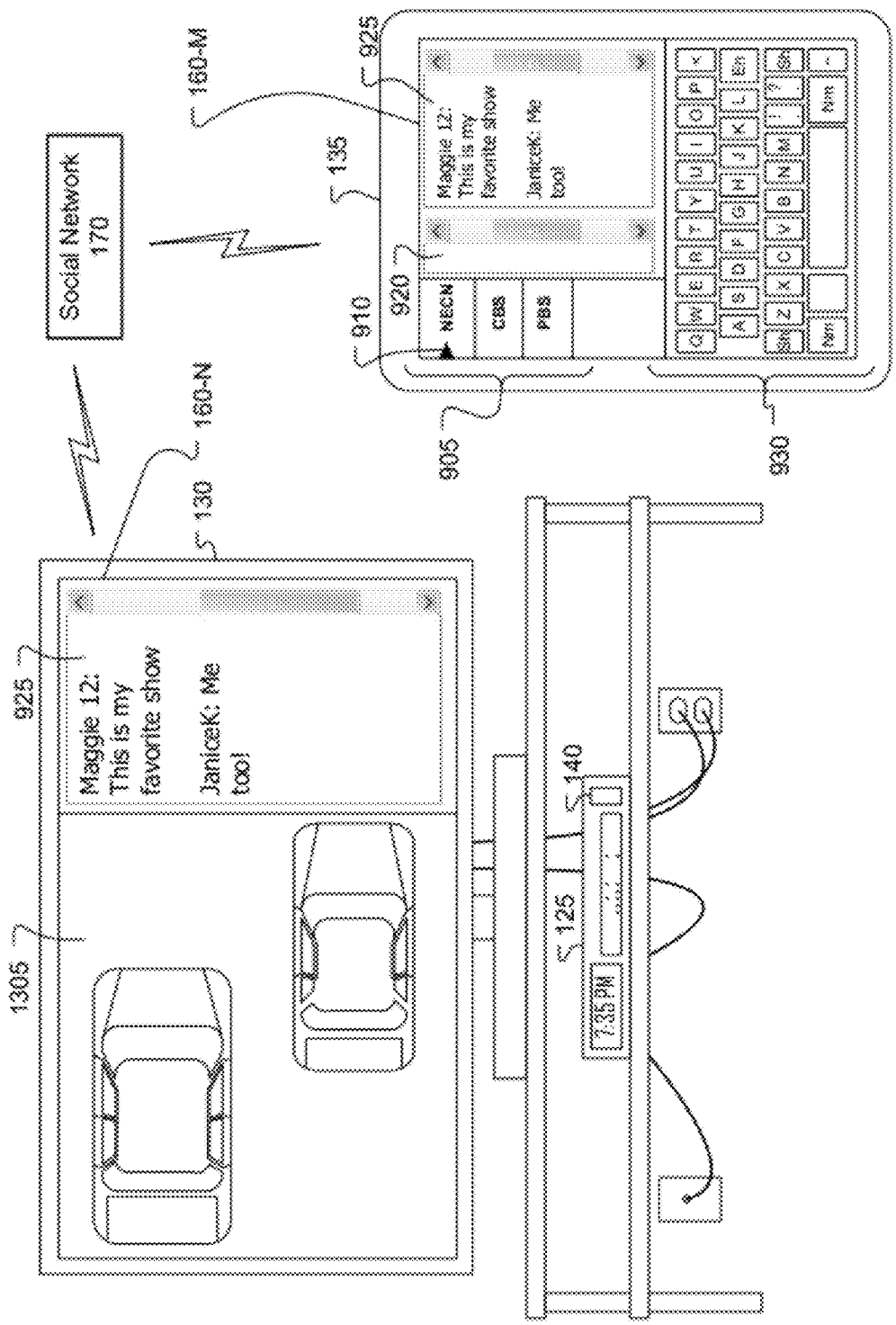
FIG. 14 illustrates an exemplary user interface of an adjunct device as an companion to user interface of a display device.

FIG. 14 illustrates an exemplary user interface 160-M of an adjunct device 135 as a companion to a user interface 160-N of a display device 130. As shown, a streaming media pane 1305 and a chat window 925 may be displayed on the user interface 160-N of the display device 130, while a keyboard control 930 configured to allow user input may be included on the user interface 160-M of the adjunct device 135 itself. Such an example allows the adjunct device 135 to provide additional functionality to the MCPS 125 and display device 130. Moreover, through use of the association of users of the media content system with users on a social network 170, the social graph and other information associated with the user of the social network 170 may be used to socially enhance the viewing of media content.

In addition to the examples discussed above, other combinations, orientations, and configurations of the IPG 310, chat information, and streaming media pane 1305 may be possible. As some examples, the chat window 925 may be included below the streaming media pane 1305 on the display device 130; the display device 130 may display an IPG 310 while the adjunct device 135 displays a streaming media pane 1305, the display device 130 may display both an IPG 310 and a streaming media pane 1305, while the adjunct device 135 displays chat functionality, etc.

As described, the social TV application 155 is illustrated as presenting an IPG 310 including broadcast TV media content 105 that is currently being aired. However, the social TV application 155 may be extended to incorporate a full IPG 310 that also includes media content 105 shown in the past and media content 105 to be delivered in the future. In such an extension, the social TV application 155 may allow for chat on any show, past, present, or future. The social TV application 155 may also provide special treatment (e.g., shading, highlighting, boldface, etc.) in the user interface 160 for currently playing, recently ended, and about to start instances of media content 105. Such an extension may further allow persistent chat, so for example, users can go back to see the chat text from the airing of previous episode of a show, and then continue the dialog for the next episode.

As another extension, the data center 165 may further be configured to cross-reference IPG information in different regions to ensure that instances of media content 105 are discoverable across time zones and regional channel lineups. This may be facilitated, for example, by storage of IPG data 110 for different regions in the database 180. Like instances of media content 105 on different channels or on at different times may be indicated in the database 180 by like identifiers. For instance, if three users of social TV applications 155 want to chat about an on-air episode of "The Simpsons" and the users are spread across multiple regions and time zones, the data center 165 may be configured to use the identifiers to map the same instance of media content 105 available in different channel lineups together. Thus the system 100 may allow the three users to discover and chat about the same show as it airs, regardless of the regional channel number that may be airing the show. Furthermore, the system 100 may be further configured to inform users of the social TV application 155 in other time zones that a show has already aired or that it will air in the future.

Another extension of the social TV application 155 may be to integrate the social TV application 155 with synchronized delivery of "on demand" media content 105 to multiple parties. Such an extension would allow chat among multiple viewers of the same "on demand" show. Such an extension may further include a user interface 160 configured to provide basic control operators, such as Play, Pause, Stop, Fast Forward, Rewind, etc., as well as an implementation of basic rules that govern who (e.g., which party to the chat) has control over the synchronized stream through these operations. For instance, a user may invite one or more friends from his friend list 705 to watch an "on demand" movie with him or her. The user inviting the friends may default to being operator of the stream for example, or may delegate ownership of the synchronized stream to another chat participant.

Yet another extension to the social TV application 155 may include the provisioning of audio and/or video chat (i.e., instead of or in addition to text-based chat as described in detail above). In the case of a two-person video chat, this may take the form of an additional video window in the user interface 160 of the adjunct device 135 or display device 130 showing the other party in the chat. In the case of a chat with more than two participants, a video chat may take the form of an additional video window divided or tiled to show all the video chat participants, or a separate additional video window corresponding to and displaying each additional video chat participant. In any case, since the chat audio may compete with the audio of the TV program being experienced, the addition of an audio/video chat feature may be configured to allow for volume adjustment both for the program content and also for the chat audio/video (or even volume adjustment and muting per chat participant).

A variation of the extension to the social TV application 155 for audio/video chat may utilize speech recognition and translation software, so that there is no conflict between the program content audio and the chat audio. In this case, a chat window may still appear, such as illustrated in FIGS. 9 and 10, but potentially without a pop-up keyboard. Instead, the user's spoken words may be captured using the speech recognition software and written into the chat text windows. Such an implementation may require use of a microphone that can capture the speaker's voice without picking up the background sound from the locally playing program content. In some cases, a microphone included in or associated with the adjunct device 135 may be utilized for capturing the voice of the user.

A still further extension to the social TV application 155 may be to enable users to take "thumbnail snapshots" of the currently playing program content, and paste these "thumbnail snapshots" into the user's chat messages. This would allow users to capture a specific moment of the show for reference in their chat text, thus providing context for the discussion after the show has moved on.

Nevertheless, through use of the adjunct device 135 as a companion device, and having access to a user's social graph from a social network 170, an enhanced television system such as the system 100 described above may transform television viewing into a new in-the-moment social experience.

Figure 15:
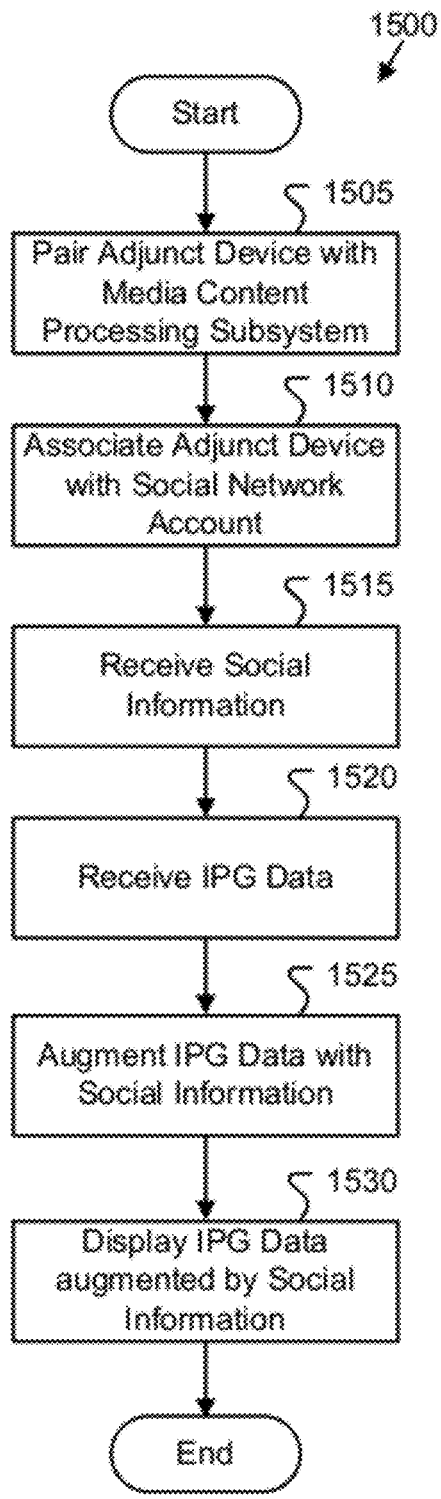
FIG. 15 illustrates an exemplary process flow for augmenting interactive program guide data with social graph data from a social network.

FIG. 15 illustrates an exemplary process flow 1500 for augmenting IPG data 110 with social graph data from a social network 170. The process 1500 may be performed by various systems, such as the system 100 described above with respect to FIG. 1. For example, the process 1500 may be performed at least in part by the social TV application 155 executed by an adjunct device 135 serving as a companion computing device.

In block 1505, the social TV application 155 pairs the adjunct device 135 with an MCPS 125. For example, a user interface 160 provided by the social TV application 155 may include an MCPS menu 210 that includes a listing of MCPSs 125 that are available for pairing with the adjunct device 135. The user may select an MCPS 125 from the MCPS menu 210 to pair the adjunct device 135 with that MCPS 125. If the MCPS 125 the user desires to pair with is not indicated in the MCPS menu 210, the user may press the add control 215 to enter in details of a new MCPS 125 to add to the list, such as the name of the MCPS 125 and an identifier and/or passcode of the MCPS 125 to allow for pairing of the adjunct device 135 with the MCPS 125. In some examples the social TV application 155 may be configured to auto-discover MCPSs 125 that are within range. If the adjunct device 135 is already paired with an MCPS 125, the user may also use the MCPS menu 210 to change the pairing of the adjunct device 135 to be with another MCPS 125.

In block 1510, the social TV application 155 associates the adjunct device 135 with a social network 170. For example, the social TV application 155 may be configured to receive login information such as username and password from the user, and may use the login information to provide access to the user's information on a social network 170, including the user's social graph. The mapping of users of the social network 170 with users of the MCPSs 125 may further be maintained in the database 180 to facilitate mapping of users of the social network 170 to subscribers of the media content provider 115.

In block 1515, the social TV application 155 receives social information 190 from the social network 170. For example, the social TV application 155 may communicate with an API of the social network 170 configured to receive and respond to requests for social information 190. Using the social graph received from the social network 170 and the mapping of users of the social network 170 with users of the MCPSs 125 maintained in the database 180, the social TV application 155 may relate which users of the social network 170 are experiencing what media content 105. The social TV application 155 may further receive social information 190 from an XMPP server 185 including which friends of the user logged into the social network 170 are also online, which chat rooms those friends have joined, which chat rooms those friends are viewing, and recent chat messages to and from those friends.

In block 1520, the social TV application 155 receives IPG data 110. For example, the social TV application 155 may receive IPG data 110 including information corresponding to instances of media content 105 being broadcast, streamed, or otherwise available for being experienced by users, such as title, subtitle, program summary, included actors, start and end time for broadcast, and any additional cost that may be incurred to view the instance of media content 105. The social TV application 155 may further receive information regarding the paired MCPS 125, such as what instance of media content 105 is presently being shown by the MCPS 125.

In block 1525, the social TV application 155 augments the IPG data 110 with social information 190. Using the social information 190, the IPG 310 may be augmented with information relating to which instances of media content 105 friends of the logged in user are presently are watching or discussing.

In block 1530, the social TV application 155 displays the IPG data 110 augmented by the social information 190. For example, the social TV application 155 may display an IPG 310 augmented to include popularity indications 405 indicative of how many of the user's friends have joined a chat room for an instance of media content 105. As another example, the social TV application 155 may display an IPG 310 augmented to include new message indicator 425 to provide the user with a notification of when there is additional content in the chat room. The social TV application 155 may further display a friend list user interface 160 indicating which friends are online and what instances of media content 105 those friends are messaging about or watching. The IPG 310 may further be augmented to provide chat room functionality to allow the user of the adjunct device 135 to chat with his or her friends in chat rooms associated with the instances of media content 105. Next, the process 1500 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the disclosure is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
    a media content processing device configured to provide media content to a display device; and
    an adjunct computing device in communication with the media content processing device and configured to:
        receive interactive program guide data that corresponds to instances of the media content,
        receive social information associated with an account of a social network, the social information including a number of friends of the account that are viewing each instance of the media content, and a number of friends that have joined a chat room for each instance of the media content,
        display a first interface that presents the interactive program guide data augmented with the social information, including for each instance of the interactive program guide data for which a corresponding instance of the media content is being viewed by at least one friend a popularity indication indicative of the number of friends viewing the corresponding instance of the media content, and for each instance of the interactive program guide data for which at least one friend has joined the chat room for the corresponding instance of the media content a popularity indication indicative of the number of friends that have joined the chat room,
        include a new message indicator for each instance of the interactive program guide data that notifies when additional content is available from the friends in the chat room for the corresponding instance of the media content,
        receive a command that identifies a particular instance of the interactive program guide data from the first interface,
        display a second interface, in response to the command, that presents a social interaction display associated with the particular instance of the interactive program guide data, wherein the social interaction display is based at least in part on a subset of the social information that augments the particular instance,
        determine, in response to the command, whether an automatic tuning feature is activated, and
        if the automatic tuning feature is activated, tune the media content processing device to a particular instance of the media content that corresponds to the particular instance of the interactive program guide data.

2. The system of claim 1, wherein the social information includes at least one of social graph information indicative of friends of the account, presence information regarding the online status of friends of the account, and chat messages between friends and the account.

3. The system of claim 1, further comprising a server in communication with the social network and the adjunct computing device, the server being configured to receive the social information from the social network and provide the social information to the adjunct computing device.

4. The system of claim 3, further comprising a database in communication with the server and configured to maintain a mapping of accounts of the social network to adjunct device accounts.

5. The system of claim 4, wherein the server is configured to utilize the mapping of accounts of the social network to the adjunct device accounts to determine the social information associated with the account of a social network to provide to the adjunct computing device.

6. The system of claim 1, wherein the adjunct computing device is further configured to directly augment the interactive program guide data with the social information to indicate which of the instances of the media content are being at least one of:
experienced by friends of the account, and
discussed by friends of the account.

7. The system of claim 1, wherein the adjunct computing device is further configured to receive the interactive program guide data from the media content processing device.

8. The system of claim 1, wherein the media content processing device is further configured to send the particular instance of the media content to the display device, and the adjunct computing device is further configured to receive state information indicative of the particular instance of the media content currently being sent to the display device.

9. The system of claim 1, wherein the social information includes social graph information indicative of friends of the account.

10. The system of claim 1, wherein the adjunct computing device is further configured to:
directly augment each instance of the interactive program guide data presented by the first interface with a corresponding subset of the social information, wherein each corresponding subset relates to activity associated with an instance of the media content that corresponds to that instance of the interactive program guide data.

11. The system of claim 1, wherein the adjunct computing device is further configured to display the particular instance of the media content in the second interface with the social interaction display.

12. The system of claim 1, wherein the adjunct computing device is further configured to transmit the social interaction display to the media content processing device to be displayed on the display device with the particular instance of the media content.

13. A method, comprising:
pairing an adjunct computing device with a media content processing device;
associating the adjunct computing device with an account of a social network;
receiving interactive program guide data corresponding to instances of media content;
receiving social information associated with the account, the social information including a number of friends of the account that are viewing each instance of media content, and a number of friends that have joined a chat room for each instance of the media content;
displaying a first interface presenting the interactive program guide data augmented with the social information, including for each instance of the interactive program guide data for which a corresponding instance of the media content is being viewed by at least one friend a popularity indication indicative of the number of friends viewing the corresponding instance of media content, and for each instance of the interactive program guide data for which at least one friend has joined the chat room for the corresponding instance of the media content a popularity indication indicative of the number of friends that have joined the chat room,
including a new message indicator for each instance of the interactive program guide data that notifies when additional content is available from the friends in the chat room for the corresponding instance of the media content;
receiving a command identifying a particular instance of the interactive program guide data from the first interface;
displaying, in response to the command, a second interface presenting a social interaction display associated with the particular instance of the interactive program guide data, the social interaction display being based at least in part on a subset of the social information that augments the particular instance;
determining, in response to the command, whether an automatic tuning feature is activated, and
if the automatic tuning feature is activated, tuning the media content processing device to a particular instance of the media content corresponding to the particular instance of the interactive program guide data.

14. The method of claim 13, further comprising:
maintaining a mapping of accounts of the social network to the adjunct device accounts; and
utilizing the mapping of accounts of the social network to the adjunct device accounts to determine the social information associated with the account to provide to the adjunct computing device.

15. The method of claim 13, wherein the social information includes at least one of social graph information indicative of friends of the account, presence information regarding the online status of friends of the account, and chat messages between friends and the account.

16. The method of claim 13, further comprising directly augmenting the interactive program guide data with the social information to indicate which of the instances of the media content are presently being at least one of:
experienced by friends of the account, and
discussed by friends of the account.

17. The method of claim 13, further comprising:
displaying the particular instance of the media content on a display device;
receiving state information indicative of the particular instance of the media content currently being displayed by the display device; and
updating the interactive program guide data to indicate the particular instance of the media content currently being displayed by the display device.

18. The method of claim 13, further comprising at least one of:
receiving an invitation from a friend of the account to at least one of tune to the particular instance of the media content, join the chat room associated with the particular instance of the media content, and view the chat room associated with the particular instance of the media content; and
sending an invitation to a friend of the account to at least one of tune to the particular instance of the media content, join the chat room associated with the particular instance of the media content, and view the chat room associated with the particular instance of the media content.

19. The method of claim 13, further comprising:
displaying the particular instance of the media content on a display device accompanied by the chat room associated with the particular instance of the media content;
receiving input from the user by the adjunct computing device; and
providing the received input as a chat message into the chat room.

20. The method of claim 13, wherein the particular instance of media content includes a synchronized on demand instance of media content.

21. A non-transitory computer-readable medium tangibly embodying computer-executable instructions configured to cause a processor of a computing device to:
- pair the computing device with a media content processing device;
- associate the computing device with an account of a social network;
- send the association of the computing device with the account of the social network to a server;
- receive interactive program guide data that corresponds to instances of media content;
- receive social information from the server according to the association of the computing device with the account of the social network, the social information including a number of friends of the account that are viewing each instance of media content, and for each instance of the interactive program guide data for which at least one friend has joined a chat room for the corresponding instance of the media content a popularity indication indicative of the number of friends that have joined the chat room;
- display a first interface that presents the interactive program guide data augmented with the social information, including for each instance of the interactive program guide data for which a corresponding instance of media content is being viewed by at least one friend a popularity indication indicative of the number of friends viewing the corresponding instance of media content, and for each instance of the interactive program guide data for which at least one friend has joined the chat room for the corresponding instance of the media content a popularity indication indicative of the number of friends that have joined the chat room;
- include a new message indicator for each instance of the interactive program guide data that notifies when additional content is available from the friends in the chat room for the corresponding instance of the media content;
- receive a command that identifies a particular instance of the interactive program guide data from the first interface;
- display, in response to the command, a second interface that presents a social interaction display associated with the particular instance of the interactive program guide data, wherein the social interaction display is based at least in part on a subset of the social information that augments the particular instance;
- determine, in response to the command, whether an automatic tuning feature is activated; and
- if the automatic tuning feature is activated, tune the media content processing device to the media content that corresponds to the particular instance of the interactive program guide.

22. The computer-readable medium of claim 21, wherein the computing device is a tablet computing device, and the instructions comprise a social television application.

23. The computer-readable medium of claim 21, wherein the media content processing device is implemented as computer executable instructions executed by the processor of the computing device.

* * * * *